United States Patent [19]

Sasaki

[11] Patent Number: 4,486,519
[45] Date of Patent: Dec. 4, 1984

[54] BISAZO COMPOUNDS AND ELECTROPHOTOGRAPHIC PHOTOCONDUCTORS COMPRISING THE BISAZO COMPOUNDS

[75] Inventor: Masaomi Sasaki, Susono, Japan

[73] Assignee: Ricoh Company, Ltd., Tokyo, Japan

[21] Appl. No.: 500,051

[22] Filed: Jun. 1, 1983

[30] Foreign Application Priority Data

Jun. 18, 1982 [JP] Japan .................................. 57-103996
Jun. 18, 1982 [JP] Japan .................................. 57-103997
Jan. 17, 1983 [JP] Japan .................................. 58-5524
Jan. 26, 1983 [JP] Japan .................................. 58-11148

[51] Int. Cl.$^3$ ............................................... G03G 5/06
[52] U.S. Cl. ........................................ 430/58; 430/73; 430/79
[58] Field of Search ................... 430/58, 73, 79, 71, 430/76, 78

[56] References Cited

U.S. PATENT DOCUMENTS 4,314,015  2/1982  Hashimoto et al. .................. 430/58
4,415,641  11/1983  Goto et al. .......................... 430/58

Primary Examiner—John E. Kittle
Assistant Examiner—John L. Goodrow
Attorney, Agent, or Firm—Flynn, Thiel, Boutell & Tanis

[57] ABSTRACT

A novel bisazo compound of the formula

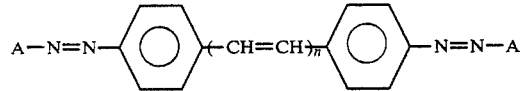

where n=2 or 3, and A is

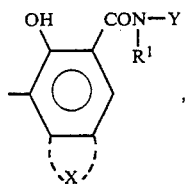 (a)

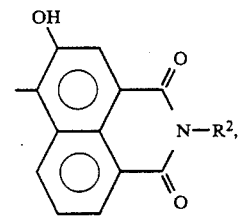

(b)

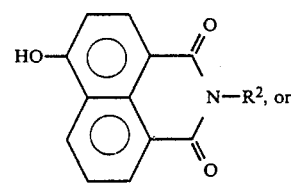

(c)

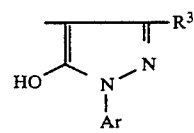

(d)

when n=2, and when n=3, A is the above (a), (b) or (c), and an electrophotographic photoconductor comprising, on an electroconductive support material, a photoconductive layer containing the above bisazo compound, which electrophotographic photoconductor exhibits relatively high photo-sensitivity and usefulness for electrophotographic copying.

15 Claims, 9 Drawing Figures

BISAZO COMPOUNDS AND ELECTROPHOTOGRAPHIC PHOTOCONDUCTORS COMPRISING THE BISAZO COMPOUNDS

BACKGROUND OF THE INVENTION

The present invention relates to novel bisazo compounds and electrophotographic photoconductors comprising the bisazo compounds, and more particularly to novel bisazo compounds and an electrophotographic photoconductor comprising, on an electroconductive support material, a photoconductive layer containing any of the novel bisazo compounds.

Conventionally, a variety of inorganic and organic electrophotographic photoconductors are known. As inorganic photoconductors for use in electrophotography, there are known types, in which the photoconductive material is, for instance, selenium, cadmium sulfide, or zinc oxide. In an electrophotographic process, a photoconductor is first exposed to corona charges in the dark so as to electrically charge the surface of the photoconductor uniformly. The thus uniformly charged photoconductor is then exposed to original light images and the portions exposed to the original light images selectively become electroconductive, so that electric charges dissipate from the exposed portions of the photoconductor, whereby latent electrostatic images corresponding to the original light images are formed on the surface of the photoconductor. The latent electrostatic images are then developed by the so-called toner which comprises a colorant, such as a dye or a pigment, and a binder agent made, for instance, of a polymeric material; thus, visible developed images can be obtained on the photoconductor. It is necessary that photoconductors for use in electrophotography have at least the following fundamental properties: (1) chargeable to a predetermined potential in the dark; (2) minimum electric charge dissipation in the dark; and (3) quick dissipation of electric charges upon exposure to light.

While the above-mentioned inorganic electrophotographic photoconductors have many advantages over other conventional electrophotographic photoconductors, at the same time they have several shortcomings from the viewpoint of practical use.

For instance, a selenium photoconductor, which is widely used at present, meets the above-mentioned three conditions (1) through (3) fairly well, but it has the shortcomings that it is difficult to work it into the form of a belt due to its poor flexibility, and it is so vulnerable to mechanical shocks that it must be handled with the utmost care. Other inorganic electrophotographic photoconductors have similar shortcomings to those of the selenium photoconductor.

Recently, electrophotographic photoconductors, employing a variety of organic photoconductive materials have been investigated, developed in order to eliminate the shortcomings of the inorganic electrophotographic photoconductors and some of them are in fact employed for practical use. Representative examples of such organic electrophotographic photoconductors are an electrophotographic photoconductor having a photoconductive layer comprising poly-N-vinylcarbazole and 2,4,7-trinitro-fluorene-9-one (U.S. Pat. No. 3,484,237); a photoconductor having a photoconductive layer comprising poly-N-vinylcarbazole which is sensitized by a pyrylium salt type coloring material (Japanese Patent Publication No. 48-25658); a photoconductor having a photoconductive layer comprising as the main component an organic pigment (Japanese Laid-Open patent application No. 47-37543); and a photoconductor having a photoconductive layer which contains as the main component an eutectic crytaline complex consisting of a dye and a resin (Japanese Laid-Open patent application No. 47-10735).

Although the above-mentioned organic electrophotographic photoconductors have many advantages over other conventional inorganic electrophotographic photoconductors, in particular, with respect to the mechanical strength and flexibility, they still have several shortcomings from the viewpoint of practical use. In particular, they are relatively low in electrophotographic photosensitivity.

Further, there is known an electrophotographic photoconductor comprising, on an electrically conductive support material, a photoconductive layer which contains an azo compound. An example of such electrophotographic photoconductor is disclosed in Japanese Patent Publication Ser. No. 44-16474, in which a monoazo compound is employed in the photoconductive layer. Another example is an electrophotographic photoconductor employing a benzidine-type bisazo compound, which is disclosed in Japanese Laid-open patent application Ser. No. 47-37543. A further example is an electrophotographic photoconductor employing a bisazo compound having a stilbene skelton, which is disclosed in Japanese Laid-open patent application Ser. No. 53-133445. The above azo compounds are in fact useful materials for the photoconductive layers of electrophotographic photoconductors. However, they also have several shortcomings from the viewpoint of practical use, particularly in terms of photosensitivity and flexibility.

SUMMARY OF THE INVENTION

It is therefore an object of the present invention to provide novel bisazo compounds and an electrophotographic photoconductor comprising, on an electroconductive support material, a photoconductive layer comprising any of the novel bisazo compound, which electrophotographic photoconductors has high photosensitivity and high flexibility.

The bisazo compound according to the present invention are represented by the following general formula:

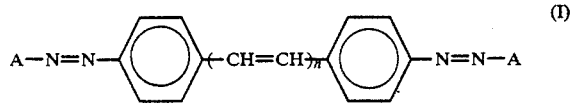
(I)

where n is an integer of 2 or 3, and when n=2, substituent A is

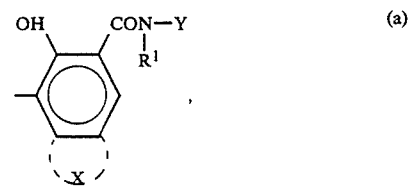
(a)

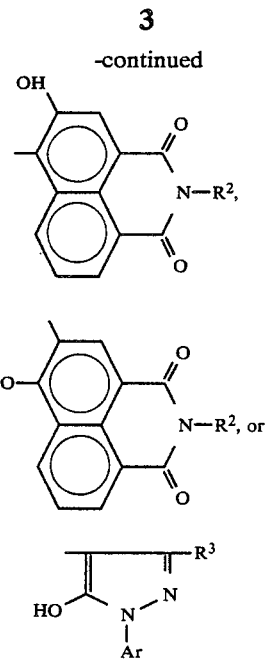

and when n=3, the substituent A is the above (a), (b) or (c), wherein $R^1$ is hydrogen, an alkyl group, an unsubstituted or substituted phenyl group; X is an unsubstituted or substituted cyclic hydrocarbon group, or an unsubstituted or substituted heterocyclic group; Y is an unsubstituted or substituted cyclic hydrocarbon group, an unsubstituted or substituted heterocyclic group, or

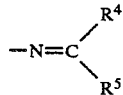

(in which $R^4$ is an unsubstituted or substituted cyclic hydrocarbon group, an unsubstituted or substituted heterocyclic group, an unsubstituted or substituted styryl group; $R^5$ is hydrogen, an alkyl group, an unsubstituted or substituted phenyl group; or $R^4$ and $R^5$ can form a ring in combination with carbon atoms bonded to $R^4$ and $R^5$); $R^2$ is an unsubstituted or substituted hydrocarbon group; $R^3$ is an alkyl group or a carboxyl group or an ester group thereof; and Ar is an unsubstituted or substituted cyclic hydrocarbon group.

DETAILED DESCRIPTION OF THE PREFERRED EMBODIMENTS

Figure 1:
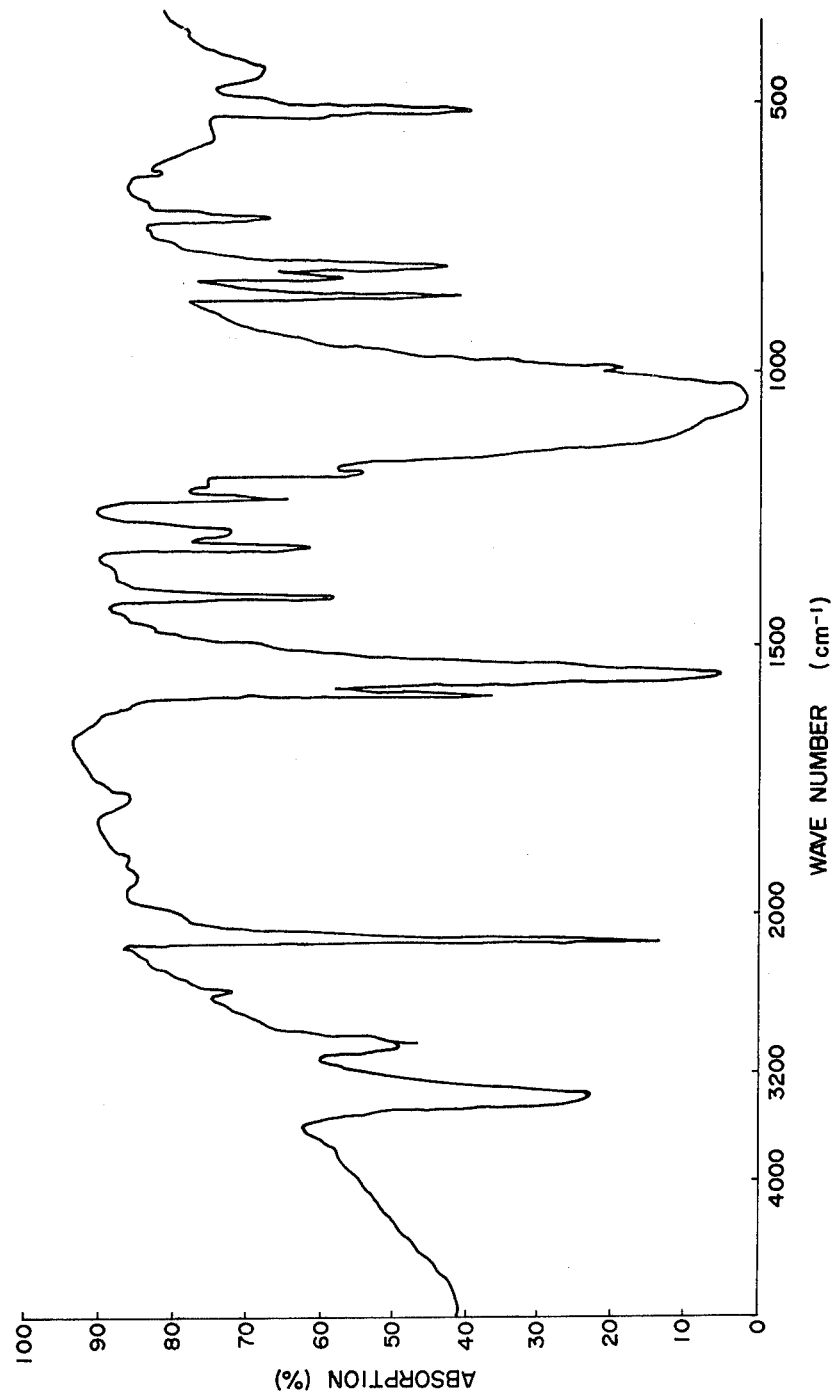
FIG. 1 is an infrared spectrum of a tetrazonium salt prepared in Example 1-1.

As mentioned previously, the bisazo compounds according to the present invention are those having the structural formula:

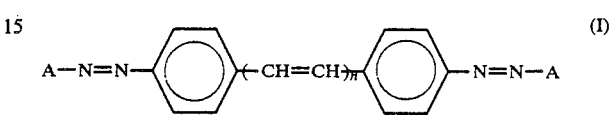

where n is an integer of 2 or 3, and when n=2, substituent A is

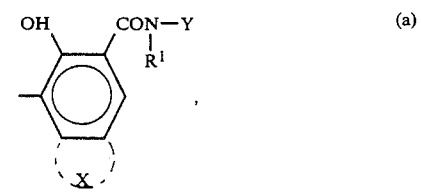

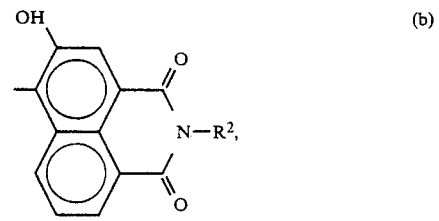

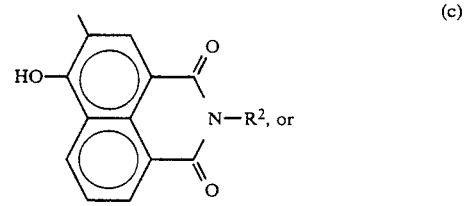

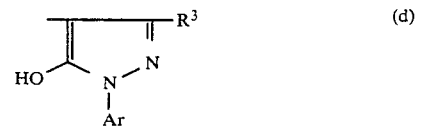

and when n=3, the substituent A is the above (a), (b) or (c), wherein $R^1$ is hydrogen, an alkyl group, an unsubstituted or substituted phenyl group; X is an unsubstituted or substituted cyclic hydrocarbon group, or an unsubstituted or substituted heterocyclic group; Y is an unsubstituted or substituted cyclic hydrocarbon group, an unsubstituted or substituted heterocyclic group, or

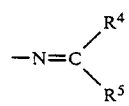

(in which R⁴ is an unsubstituted or substituted cyclic hydrocarbon group, an unsubstituted or substituted heterocyclic group, an unsubstituted or substituted styryl group; R⁵ is hydrogen, an alkyl group, an unsubstituted or substituted phenyl group; or R⁴ and R⁵ can form a ring in combination with carbon atoms bonded to R⁴ and R⁵); R² is an unsubstituted or substituted hydrocarbon group; R³ is an alkyl group or a carboxyl group or an ester group thereof; and Ar is an unsubstituted or substituted cyclic hydrocarbon group.

An electrophotographic photoconductor according to the present invention contains any of the bisazo compounds of the above formula in the photoconductive layer thereof.

In the above formula, specific examples of the cyclic hydrocarbon group represented by X are a benzene ring and a naphthalene ring. Specific examples of the heterocyclic group represented by X are an indole ring, a carbazole ring and a benzofuran ring. Specific examples of the cyclic hydrocarbon ring represented by Y and R⁴ are a phenyl group, a naphthyl group, an anthryl group and a pyrenyl group. Specific examples of the heterocyclic group represented by Y and R⁴ are a pyridyl group, a thienyl group, a furyl group, an indolyl group, a benzofuranyl group, a carbazolyl group and a dibenzofuranyl group. An example of the ring formed by R⁴ and R⁵ in combination with carbon atoms is a fluorene ring. Specific examples of the hydrocarbon group represented by R² are an alkyl group, such as a methyl group, an ethyl group and a butyl group, a propyl group; and an unsubstituted or substituted aryl group, such as a phenyl group. Examples of a substituent of the hydrocarbon group represented by R² are an alkyl group, such as a methyl group, an ethyl group, a propyl group and a butyl group; an alkoxy group, such as a methoxy group, an ethoxy group, a propoxy group and butoxy group; a halogen, such as chlorine and bromine; a hydroxyl group; and a nitro group. Examples of a substituent of the phenyl group represented by R¹ and examples of a substituent of the cyclic hydrocarbon group and the heterocyclic group represented by X are a halogen, such as chlorine and bromine. Specific examples of a substituent of the cyclic hydrocarbon group and the heterocyclic group represented by Y or R⁴, and specific examples of a substituent of the ring formed by R⁴ and R⁵ are an alkyl group, such as a methyl group, an ethyl group, a propyl group and a butyl group; an alkoxy group, such as a methoxy group, an ethoxy group, a propoxy group; a halogen, such as chlorine and bromine; a dialkyl amino group, such as a dimethylamino group and a diethylamino group; a diaralkylamino group, such as a dibenzylamino group; a halomethyl group, such as a trifluoromethyl group; a nitro group; a cyano group; a carboxyl group and an ester group thereof; a hydroxyl group; and a sulfonic group, such as —SO₃Na. Specific examples of the cyclic hydrocarbon group represented by Ar are a phenyl group and a naphthyl group. Substituents of Ar are, for example, an alkyl group, such as a methyl group, an ethyl group, a propyl group and a butyl group; an alkoxy group, such as a methoxy group, a propoxy group and a butoxy group; a nitro group; a halogen, such as chlorine and bromine; a cyano group; and a dialkylamino group, such as a dimethylamino group and a diethylamino group.

Specific examples of the bisazo compounds of the above formula are shown below only by showing the structure of the substituent A in the following general formula of the bisazo compounds according to the present invention:

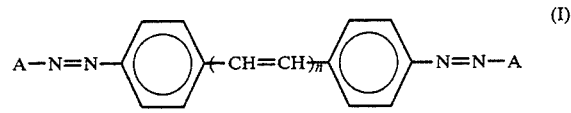

where n=2 or 3.

The prefixes 1- and 2- of the numbers of the following bisazo compounds respectively indicate the bisazo compounds in which n is 2, and the bisazo compounds in which n is 3.

| Bisazo Compound No. | A |
|---|---|
| 1-1 2-1 | 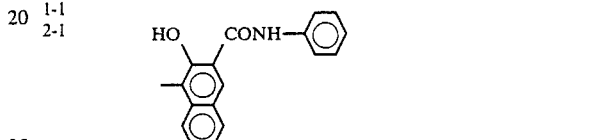 |
| 1-2 2-2 | 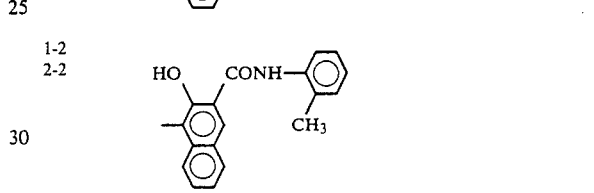 |
| 1-3 2-3 | 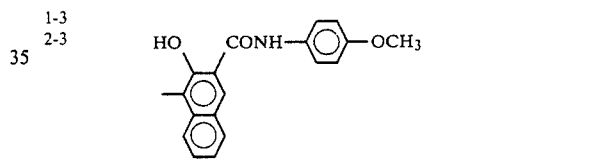 |
| 1-4 2-4 | 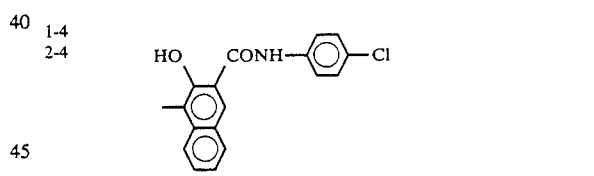 |
| 1-5 2-5 | 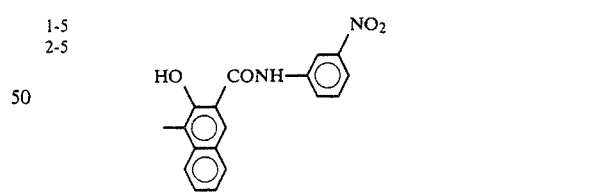 |
| 1-6 2-6 | 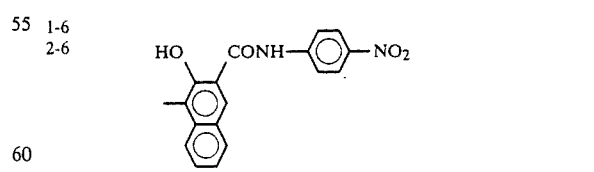 |
| 1-7 2-7 | 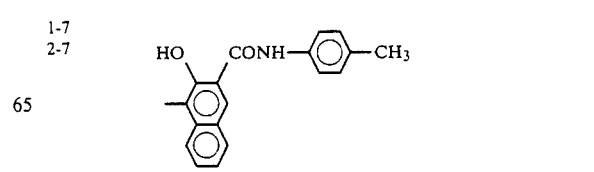 |

-continued
| Bisazo Compound No. | A |
|---|---|
| 1-8 2-8 | 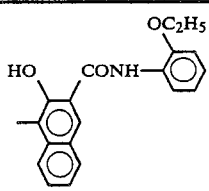 |
| 1-9 2-9 | 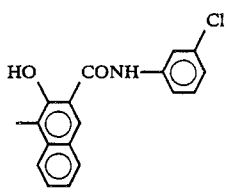 |
| 1-10 2-10 | 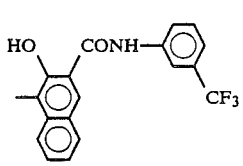 |
| 1-11 2-11 | 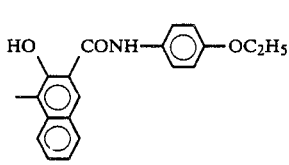 |
| 1-12 2-12 | 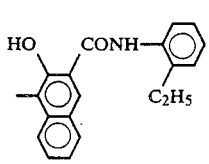 |
| 1-13 2-13 | 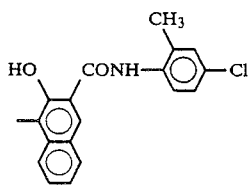 |
| 1-14 2-14 | 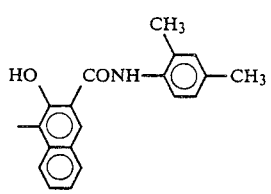 |
| 1-15 2-15 | 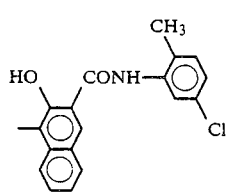 |
-continued
| Bisazo Compound No. | A |
|---|---|
| 1-16 2-16 | 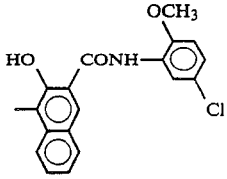 |
| 1-17 2-17 | 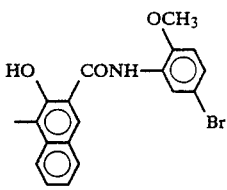 |
| 1-18 2-18 | 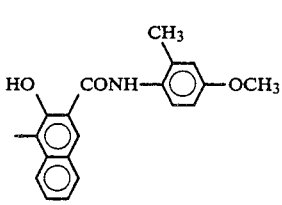 |
| 1-19 2-19 | 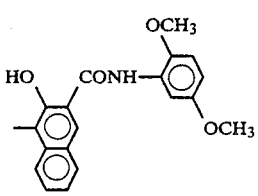 |
| 1-20 2-20 | 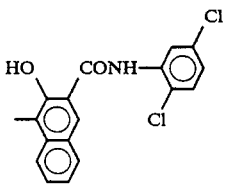 |
| 1-21 2-21 | 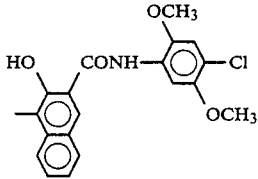 |
| 1-22 2-22 | 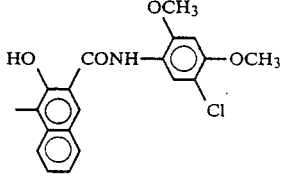 |
| 1-23 2-23 | 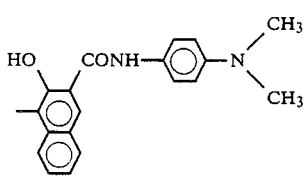 |

-continued
| Bisazo Compound No. | A |
|---|---|
| 1-24, 2-24 | 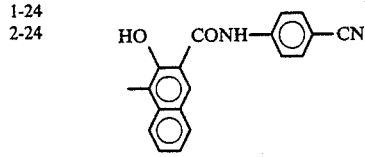 |
| 1-25, 2-25 | 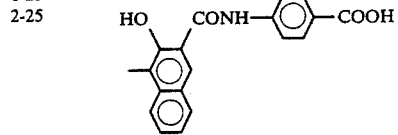 |
| 1-26, 2-26 | 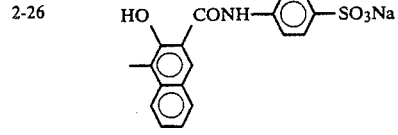 |
| 1-27, 2-27 | 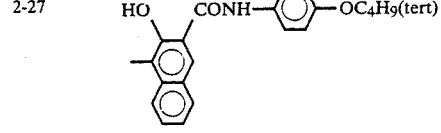 |
| 1-28, 2-28 | 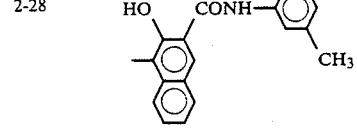 |
| 1-29, 2-29 | 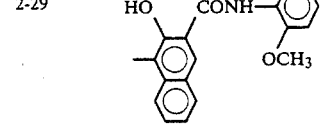 |
| 1-30, 2-30 | 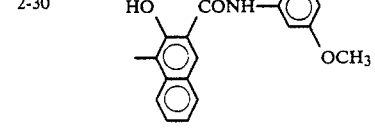 |
| 1-31, 2-31 | 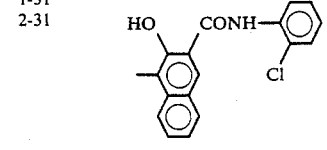 |
| 1-32, 2-32 | 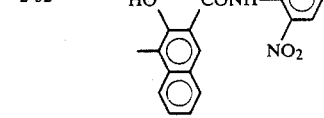 |
-continued
| Bisazo Compound No. | A |
|---|---|
| 1-33, 2-33 | 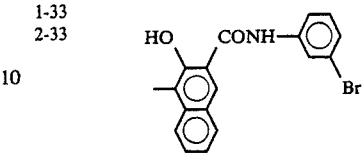 |
| 1-34, 2-34 | 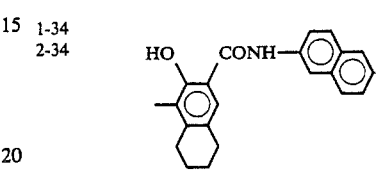 |
| 1-35, 2-35 | 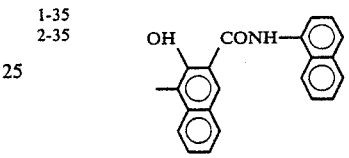 |
| 1-36, 2-36 | 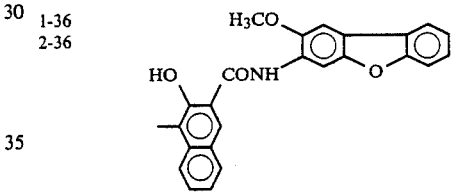 |
| 1-37, 2-37 | 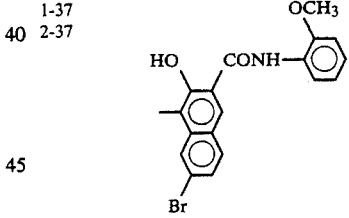 |
| 1-38, 2-38 | 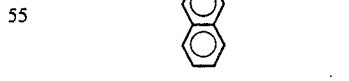 |
| 1-39, 2-39 | 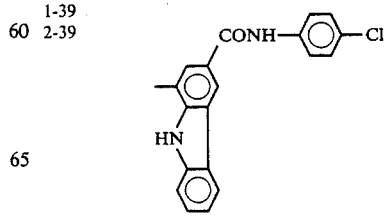 |

| Bisazo Compound No. | A |
|---|---|
| 1-40 2-40 | 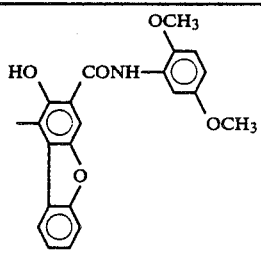 |
| 1-41 2-41 | 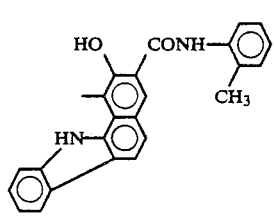 |
| 1-42 2-42 | 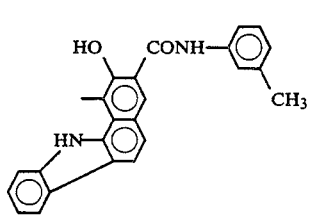 |
| 1-43 2-43 | 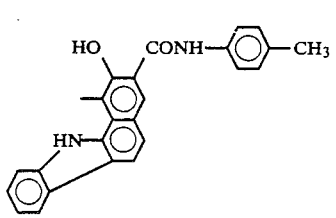 |
| 1-44 2-44 | 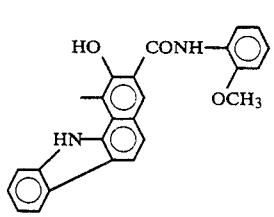 |
| 1-45 2-45 | 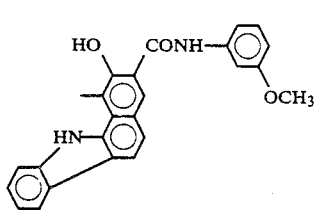 |
| 1-46 2-46 | 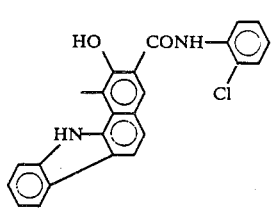 |
| 1-47 2-47 | 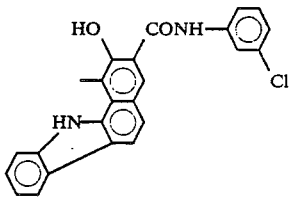 |
| 1-48 2-48 | 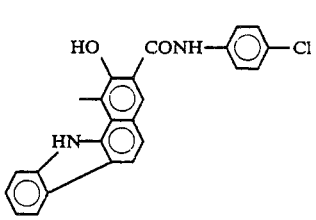 |
| 1-49 2-49 | 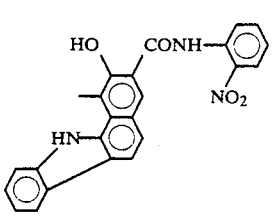 |
| 1-50 2-50 | 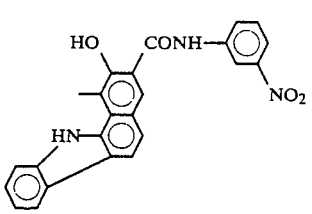 |
| 1-51 2-51 | 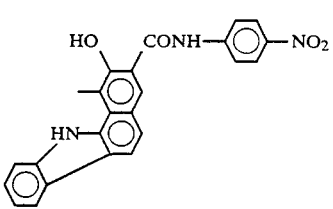 |
| 1-52 2-52 | 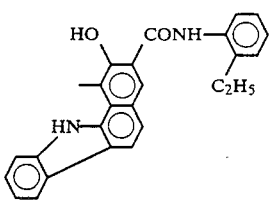 |
| 1-53 2-53 | 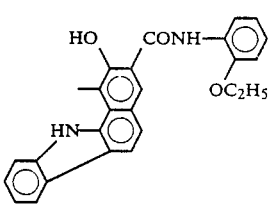 |

-continued
| Bisazo Compound No. | A |
|---|---|
| 1-54 2-54 | 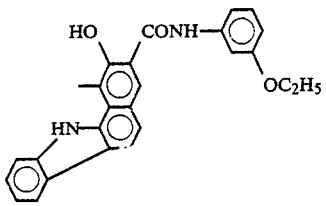 |
| 1-55 2-55 | 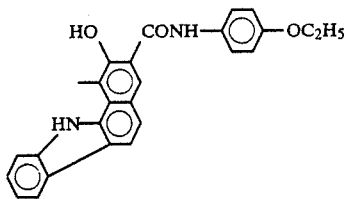 |
| 1-56 2-56 | 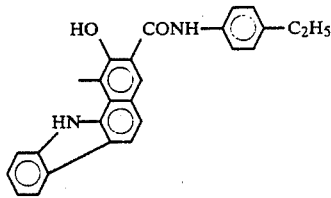 |
| 1-57 2-57 | 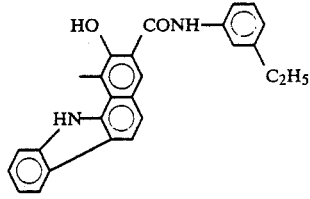 |
| 1-58 2-58 | 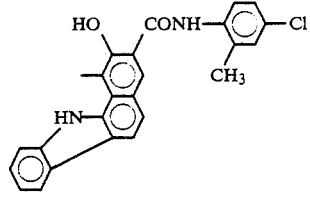 |
| 1-59 2-59 | 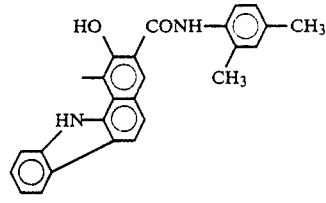 |
| 1-60 2-60 | 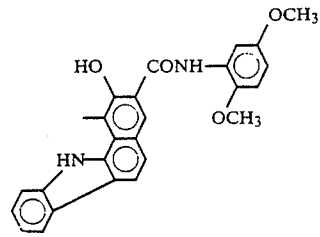 |
-continued
| Bisazo Compound No. | A |
|---|---|
| 1-61 2-61 | 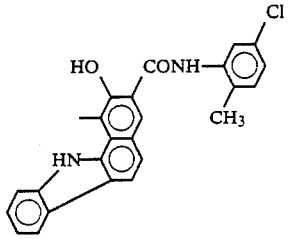 |
| 1-62 2-62 | 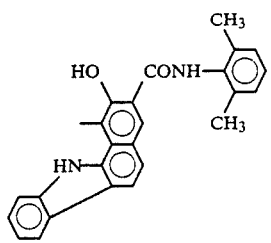 |
| 1-63 2-63 | 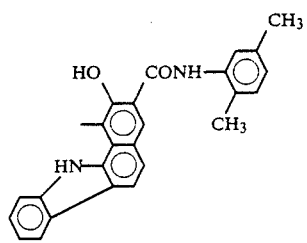 |
| 1-64 2-64 | 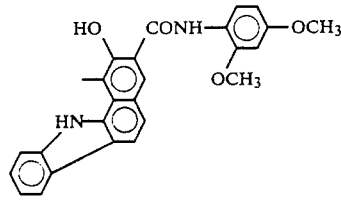 |
| 1-65 2-65 | 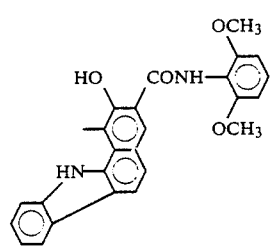 |
| 1-66 2-66 | 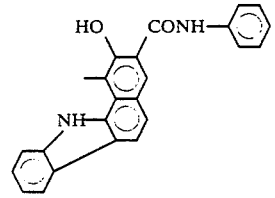 |

-continued
| Bisazo Compound No. | A |
|---|---|
| 1-67 2-67 | 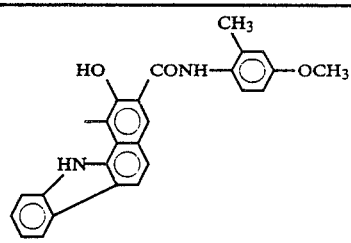 |
| 1-68 2-68 | 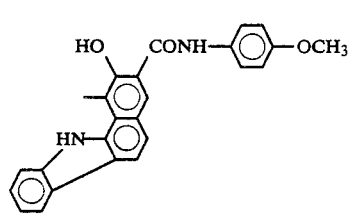 |
| 1-69 2-69 | 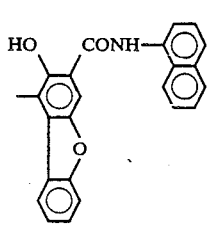 |
| 1-70 2-70 | 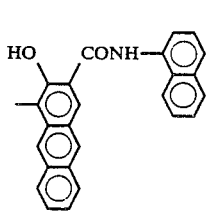 |
| 1-71 2-71 | 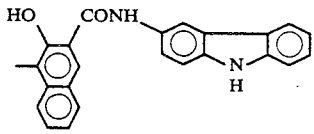 |
| 1-72 2-72 | 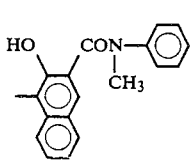 |
| 1-73 2-73 | 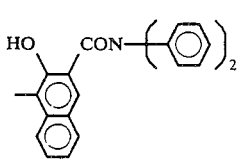 |
| 1-74 2-74 | 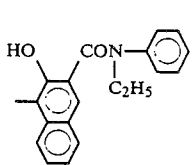 |
-continued
| Bisazo Compound No. | A |
|---|---|
| 1-75 2-75 | 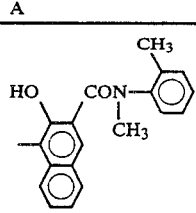 |
| 1-76 2-76 | 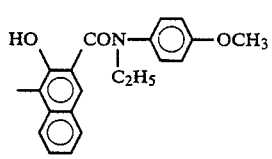 |
| 1-77 2-77 | 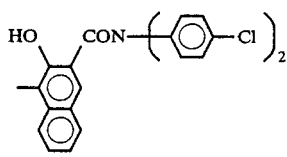 |
| 1-78 2-78 | 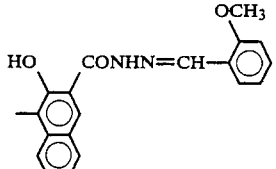 |
| 1-79 2-79 | 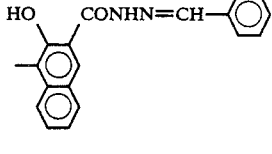 |
| 1-80 2-80 | 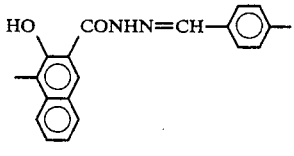 |
| 1-81 2-81 | 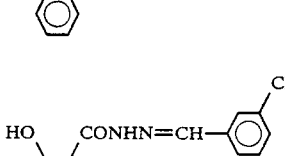 |
| 1-82 2-82 | 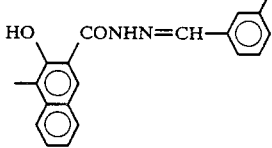 |

| Bisazo Compound No. | A |
|---|---|
| 1-83 2-83 | 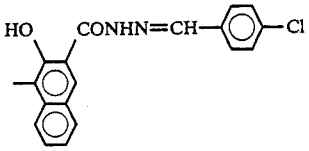 |
| 1-84 2-84 | 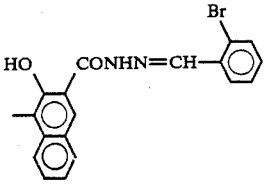 |
| 1-85 2-85 | 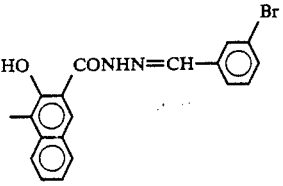 |
| 1-86 2-86 | 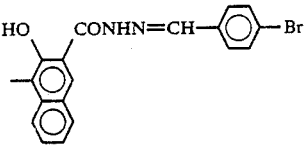 |
| 1-87 2-87 | 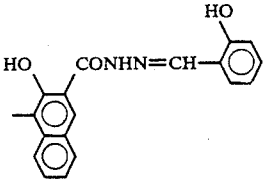 |
| 1-88 2-88 | 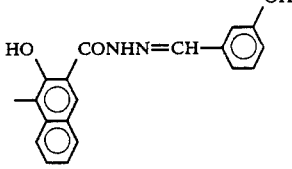 |
| 1-89 2-89 | 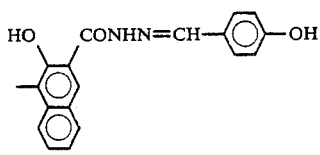 |
| 1-90 2-90 | 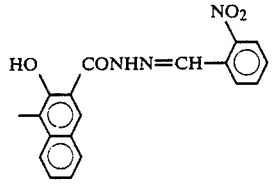 |
| 1-91 2-91 | 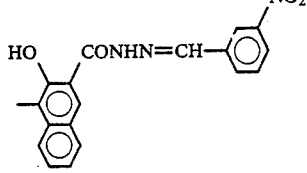 |
| 1-92 2-92 | 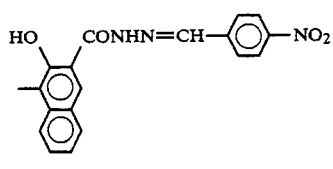 |
| 1-93 2-93 | 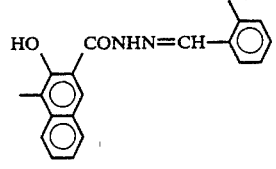 |
| 1-94 2-94 | 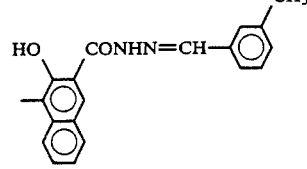 |
| 1-95 2-95 | 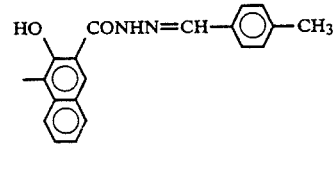 |
| 1-96 2-96 | 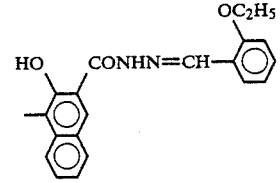 |
| 1-97 2-97 | 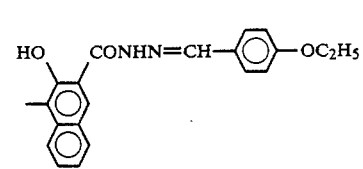 |
| 1-98 2-98 | 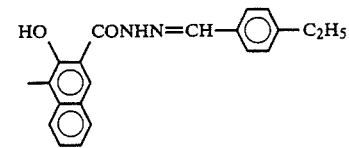 |

-continued
| Bisazo Compound No. | A |
|---|---|
| 1-99<br>2-99 | 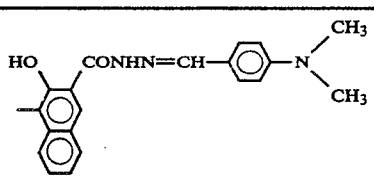 |
| 1-100<br>2-100 | 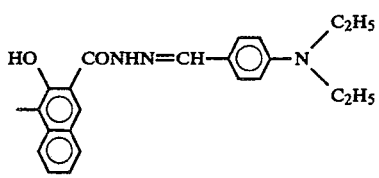 |
| 1-101<br>2-101 | 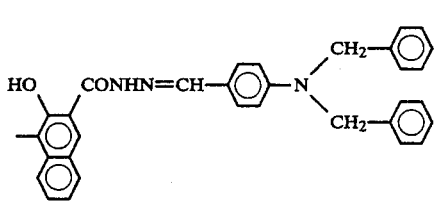 |
| 1-102<br>2-102 | 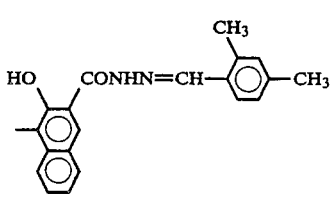 |
| 1-103<br>2-103 | 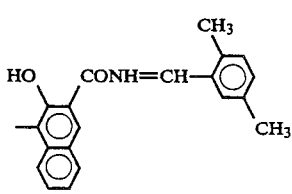 |
| 1-104<br>2-104 | 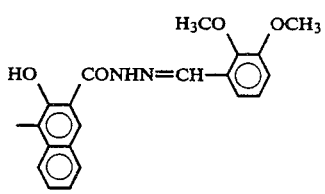 |
| 1-105<br>2-105 | 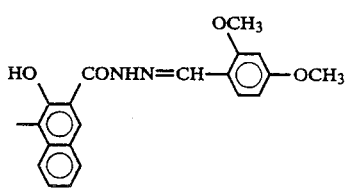 |
| 1-106<br>2-106 | 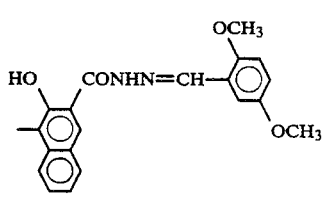 |
-continued
| Bisazo Compound No. | A |
|---|---|
| 1-107<br>2-107 | 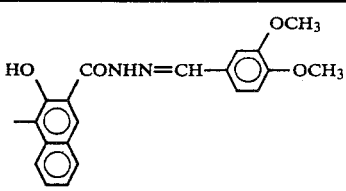 |
| 1-108<br>2-108 | 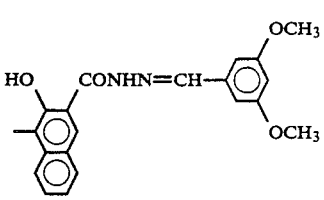 |
| 1-109<br>2-109 | 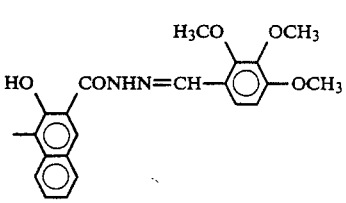 |
| 1-110<br>2-110 | 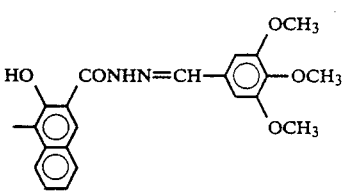 |
| 1-111<br>2-111 | 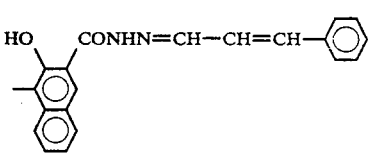 |
| 1-112<br>2-112 | 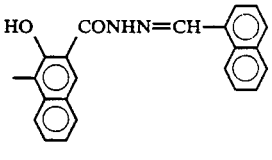 |
| 1-113<br>2-113 | 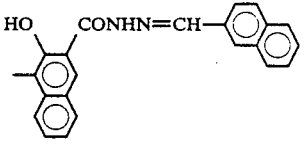 |
| 1-114<br>2-114 | 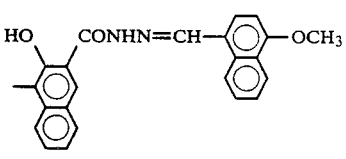 |

| Bisazo Compound No. | A |
|---|---|
| 1-115 2-115 | 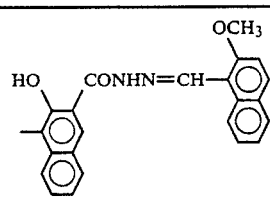 |
| 1-116 2-116 | 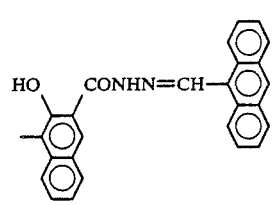 |
| 1-117 2-117 | 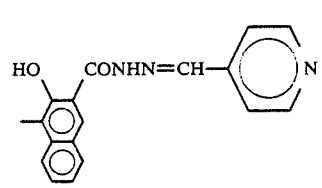 |
| 1-118 2-118 | 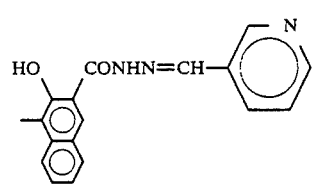 |
| 1-119 2-119 | 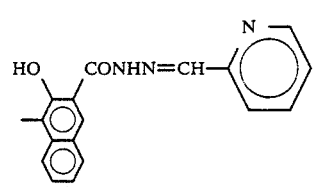 |
| 1-120 2-120 | 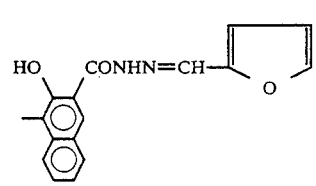 |
| 1-121 2-121 | 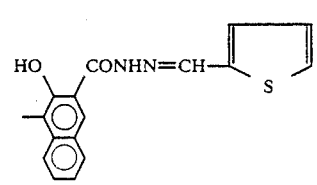 |
| 1-122 2-122 | 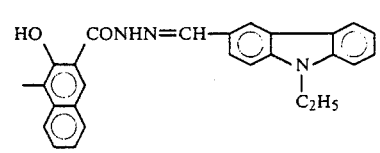 |
| 1-123 2-123 | 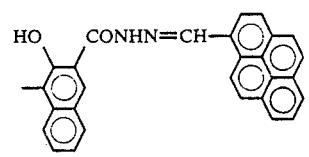 |
| 1-124 2-124 | 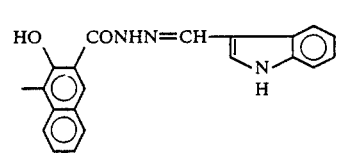 |
| 1-125 2-125 | 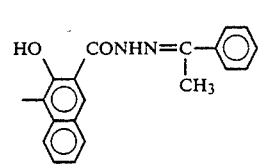 |
| 1-126 2-126 | 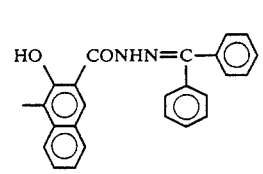 |
| 1-127 2-127 | 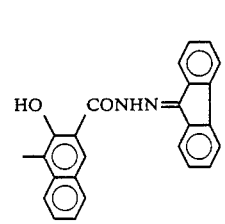 |
| 1-128 2-128 | 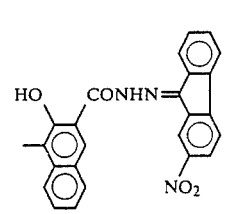 |
| 1-129 2-129 | 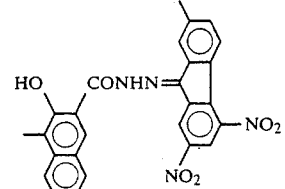 |
| 1-130 2-130 | 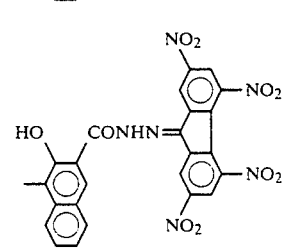 |

-continued
| Bisazo Compound No. | A |
|---|---|
| 1-131 2-131 | 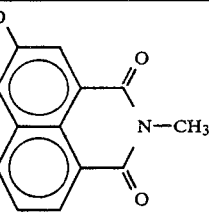 N—CH₃ |
| 1-132 2-132 | 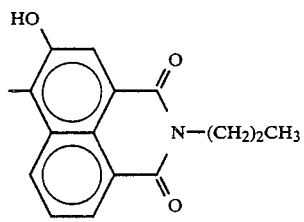 N—(CH₂)₂CH₃ |
| 1-133 2-133 | 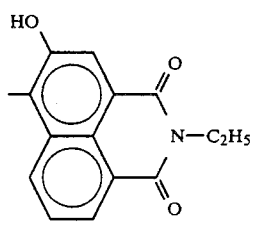 N—C₂H₅ |
| 1-134 2-134 | 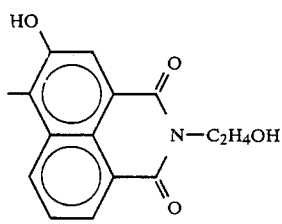 N—C₂H₄OH |
| 1-135 2-135 | 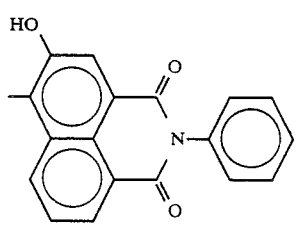 N—phenyl |
| 1-136 2-136 | 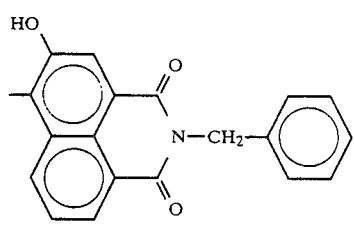 N—CH₂—phenyl |
| 1-137 2-137 | 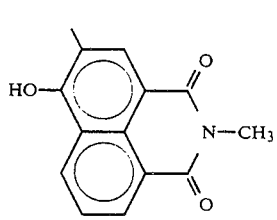 N—CH₃ |
-continued
| Bisazo Compound No. | A |
|---|---|
| 1-138 2-138 | 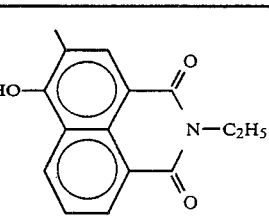 N—C₂H₅ |
| 1-139 2-139 | 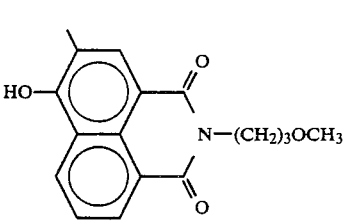 N—(CH₂)₃OCH₃ |
| 1-140 2-140 | 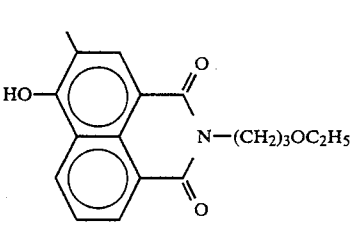 N—(CH₂)₃OC₂H₅ |
| 1-141 2-141 | 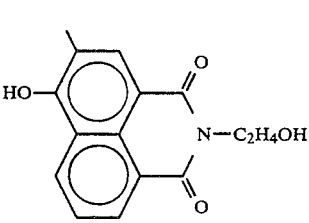 N—C₂H₄OH |
| 1-142 2-142 | 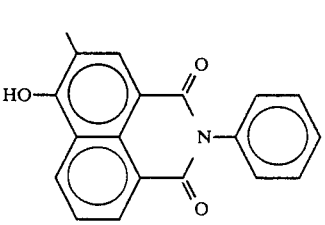 N—phenyl |
| 1-143 2-143 | 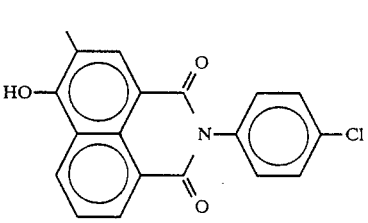 N—(4-Cl-phenyl) |
| 1-144 2-144 | 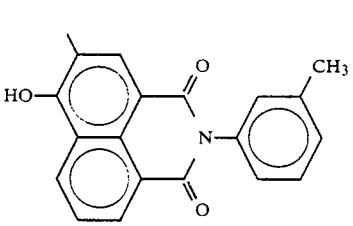 N—(3-CH₃-phenyl) |

| Bisazo Compound No. | A |
|---|---|
| 1-145 | |
| 2-145 | 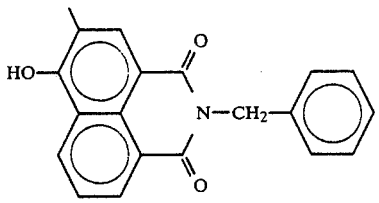 |
| 1-146 | 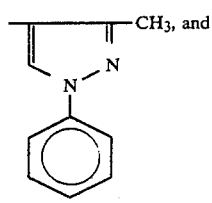 CH₃, and |
| 1-147 | 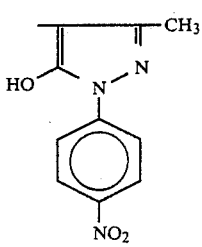 |
| 1-148 | 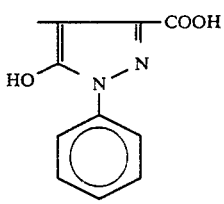 |
| 1-149 | 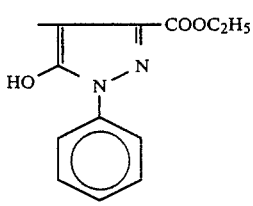 |
| 1-150 | 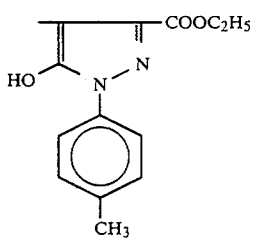 |

The above bisazo compounds of the formula (I) can be prepared by reacting a tetrazonium salt of the following formula (II) with any of the following couplers of the formulae (III)-a through (III)-d, provided that the coupler of the formula (III)-d is not employed when the bisazo compounds with n=3 is prepared.

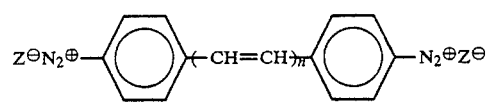 (II)

where Z is an anionic functional group, and n is an integer of 2 or 3.

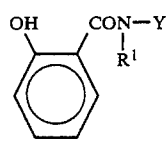 (III)-a

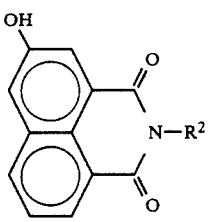 (III)-b

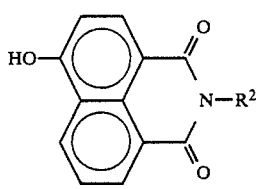 (III)-c

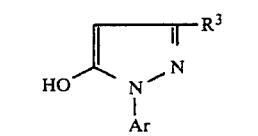 (III)-d wherein $R^1$ is hydrogen, an alkyl group, an unsubstituted or substituted phenyl group; X is an unsubstituted or substituted cyclic hydrocarbon group, or an unsubstituted or substituted heterocyclic group; Y is an unsubstituted or substituted cyclic hydrocarbon group, an unsubstituted or substituted heterocyclic group, or

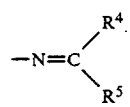

(in which $R^4$ is an unsubstituted or substituted cyclic hydrocarbon group, an unsubstituted or substituted heterocyclic group, an unsubstituted or substituted styryl group; $R^5$ is hydrogen, an alkyl group, an unsubstituted or substituted phenyl group; or $R^4$ and $R^5$ can form a ring in combination with carbon atoms bonded to $R^4$ and $R^5$); $R^2$ is an unsubstituted or substituted hydrocarbon group; $R^3$ is an alkyl group or a carboxyl group or an ester group thereof; and Ar is an unsubstituted or substituted cyclic hydrocarbon group.

More specifically, a bisazo compound of the following formula can be prepared as follows,

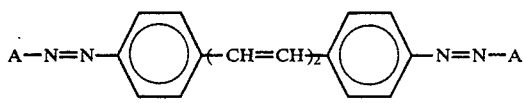

which bisazo compound corresponds to a bisazo compound of the above described general formula (I) in which n=2 and the substituent A is the same as that defined in the general formula (I).

A tetrazonium salt for use in preparing the above bisazo compound is prepared by reducing, for example, 1,4-bis(4-nitrophenyl)-1,3-butadiene to obtain 1,4-bis(4-aminophenyl)-1,3-butadiene and by subjecting the thus obtained 1,4-bis(4-aminophenyl)-1,3-butadiene to diazotization.

More specifically, 1,4-bis(4-nitrophenyl)-1,3-butadiene can be prepared by the so-called Wittig-Horner reaction in which 4-nitrocinnamaldehyde is made to react with diethyl 4-nitrobenzylphosphonate. The 1,4-bis(4-nitrophenyl)-1,3-butadiene is then reduced to prepare 1,4-bis(4-aminophenyl)-1,3-butadiene, in an organic solvent, such as N,N-dimethylformamide, in the presence of a reducing agent, such as a mixture of iron and hydrochloric acid. This reduction reaction terminates within a period of 30 minutes to 2 hours when the reaction temperature is in the range of 70° C. to 120° C.

Diazotization of the thus prepared 1,4-bis(4-aminophenyl)-1,3-butadiene is conducted as follows:

1,4-bis(4-aminophenyl)-1,3-butadiene is added to a dilute inorganic acid, such as dilute hydrochloric acid or dilute sulfuric acid. To this mixture is added an aqueous solution of sodium nitrite, while maintaining the temperature of the reaction mixture in the range of −10° C. to 10° C. This diazotization reaction terminates within 30 minutes to 3 hours. It is preferable that the diazonium compound of 1,4-bis(4-aminophenyl)-1,3-butadiene be separated in the form of a tetrazonium salt by adding, for example, fluoboric acid to the reaction mixture, to precipitate the tetrazonium salt. The tetrazonium salt is then separated from the reaction mixture by filtration. To the thus obtained tetrazonium salt is added one of the above-described coupling components in an amount of 1 to 10 moles, preferably in an amount of 2 to 5 moles, with respect to one mole of the tetrazonium salt, so as to allow a coupling reaction. In practice, this coupling reaction is accomplished by dissolving both the tetrazonium salt and the coupling component in an organic solvent, such as N,N-dimethylformamide or dimethyl sulfoxide and then adding dropwise an alkaline aqueous solution, such as an aqueous solution of sodium acetate, to the reaction mixture, while maintaining the reaction mixture at temperatures between approximately −10° C. to 10° C. Thus, a novel bisazo compound of the formula (I)-1 according to the present invention can be obtained.

The invention will now be described in more detail by referring to the following examples:

EXAMPLE 1-1

(1) Preparation of Diazonium Salt 13.0 g of 1,4-bis(4-aminophenyl)-1,3-butadiene was added to a dilute sulfuruc acid prepared by mixing 200 ml of water and 17 ml of concentrated sulfuric acid. The mixture was stirred at 60° C. for 30 minutes and was then cooled rapidly to 0° C. To the mixture, there was added dropwise with stirring, over a period of 40 minutes, an aqueous solution of sodium nitrite prepared by dissolving 8.40 g of sodium nitrite in 30 ml of water, while maintaining the reaction mixture at temperatures ranging from 0° C. to 1° C. The reaction mixture was further stirred in the same temperature range for 30 minutes.

Unreacted materials, which were small in amount, were removed from the reaction mixture by filtration. To the filtrate was then added 60 ml of a 42% fluoboric acid. Orange crystals separated, which were collected on a suction funnel and washed with a small amount of methanol and dried, whereby the desired tetrazonium difluoroborate was obtained in the form of orange needle-like crystals. The yield was 19.7 g (82.0%). The decomposition point of the thus obtained tetrazonium salt was 115° C. An infrared spectrum of the tetrazonium salt taken by use of a KBr tablet indicated an infrared absorption at 2,200 cm$^{-1}$ characteristic of the —N≡N— bonds in the tetrazonium salt. This infrared spectrum is shown in FIG. 1.

(2) Preparation of Diazo Compound No. 1-1

2.77 g of 2-hydroxy-3-naphthoic acid anilide (a coupling component) was dissolved in 340 ml of N,N-dimethylformamide. To this solution, 2.17 g of the tetrazonium salt prepared in the above (1) was added. To the mixture, an aqueous solution of sodium acetate prepared by dissolving 1.64 g of sodium acetate in 18 ml of water was added dropwise over a period of 50 minutes, while the temperature of the reaction mixture was maintained at 20° C. to 26° C. After the dropwise addition of the sodium acetate aqueous solution, the reaction mixture was stirred at room temperature for 3 hours. Precipitates were formed. The precipitates were collected by filtration and were then washed with N,N-dimethylformamide three times, using 350 ml thereof at each time. The precipitates were then washed with water two times, using 350 ml thereof at each time. The thus purified precipitates were then dried under reduced pressure, with application of heat thereto, whereby a bisazo compound No. 1-1 shown in Table 3 was obtained. The yield was 3.53 g (90.0%).

The elemental analysis of the bisazo compound indicated as follows:

|     | Calculated | Found |
| --- | --- | --- |
| % C | 76.50 | 76.33 |
| % H | 4.63 | 4.53 |
| % N | 10.71 | 10.55 |

Figure 2:
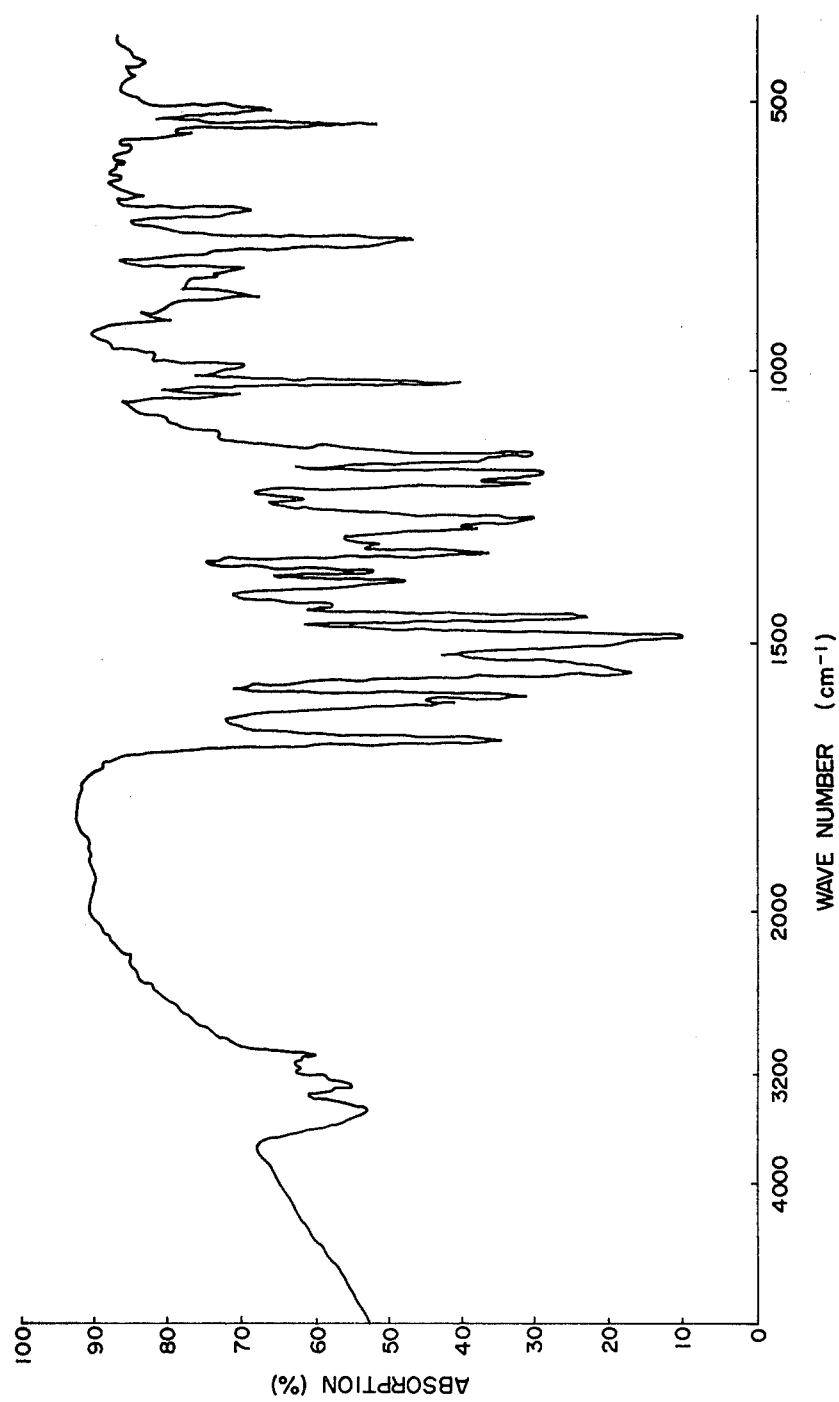
FIG. 2 is an infrared spectrum of a bisazo compound No. 1-1 prepared in Example 1-1.

An infrared spectrum of this bisazo compound, taken by use of a KBr tablet, which is shown in FIG. 2, indicated an infrared absorption at 1680 cm$^{-1}$ characteristic of the secondary amide.

EXAMPLES 1-2~1-14

Example 1-1 was repeated except that the coupling component employed in Example 1-1 was replaced by the coupling components listed in Table 1, whereby bisazo compounds Nos. 1-29, 1-3, 1-2, 1-7, 1-4, 1-5, 1-6, 1-8, 1-19, 1-15, 1-13, 1-14 and 1-21 were prepared, which bisazo compounds are listed in Table 3.

TABLE 1
| Compound No. | Coupling Component | Compound No. | Coupling Component |
|---|---|---|---|
| 1-29 | 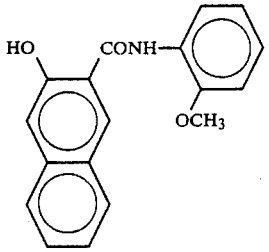 | 1-3 | 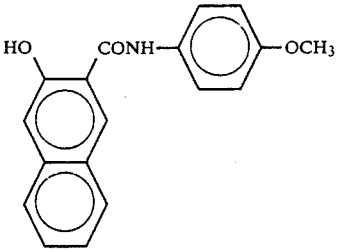 |
| 1-2 | 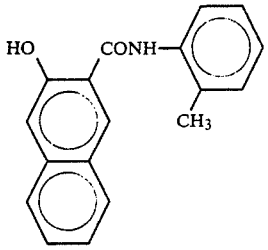 | 1-7 | 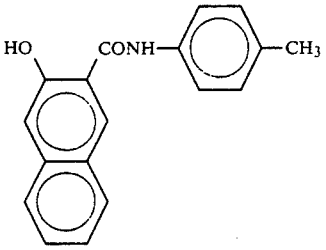 |
| 1-4 | 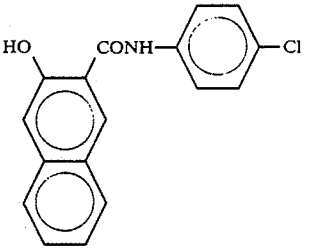 | 1-5 | 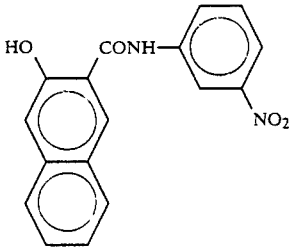 |
| 1-6 | 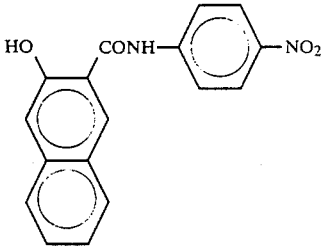 | 1-8 | 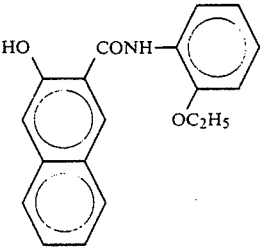 |
| 1-19 | 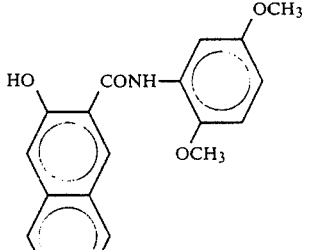 | 1-15 | 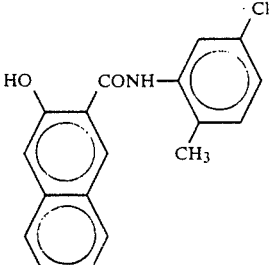 |

TABLE 1-continued

| Compound No. | Coupling Component | Compound No. | Coupling Component |
|---|---|---|---|
| 1-13 | HO, CONH—(ring)—Cl, CH₃ (naphthol) | 1-14 | HO, CONH—(ring)—CH₃, CH₃ (naphthol) |
| 1-21 | HO, CONH—(ring with OCH₃, Cl, OCH₃) (naphthol) | | |

EXAMPLE 1-15

Figure 3:
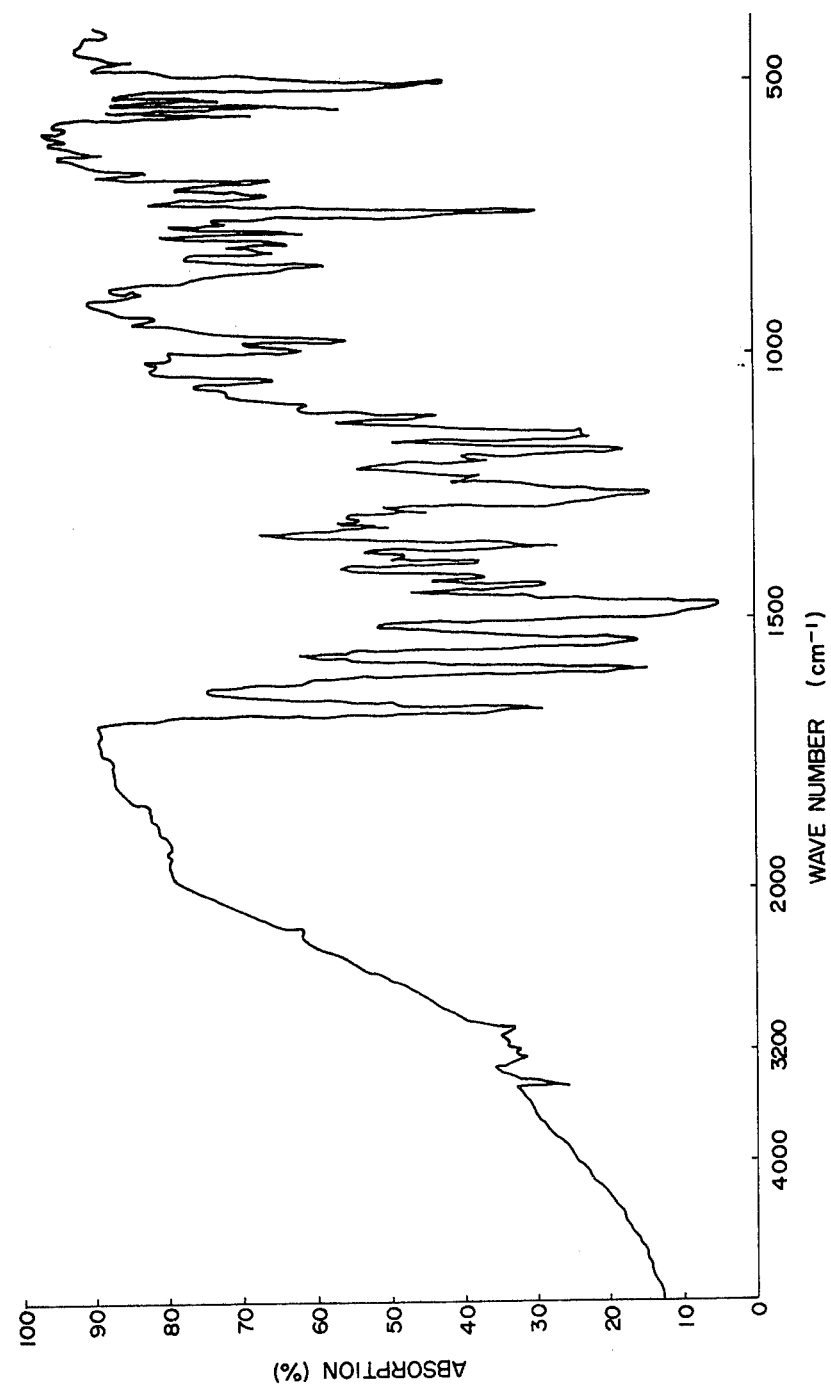
FIG. 3 is an infrared spectrum of a bisazo compound No. 1-66 prepared in Example 1-15.

1.48 g of 2-hydroxy-3-phenylcarbamoyl-11H-benzo[a] carbazole (coupling component) was dissolved in 140 ml of N,N-dimethylformamide. To this solution, 0.87 g of the tetrazonium salt prepared in Example 1-1 was added. To the mixture, a sodium acetate aqueous solution prepared by dissolving 0.69 g of sodium acetate in 7 ml of water was added dropwise over a period of 30 minutes, while the temperature of the reaction mixture was maintained at 20° C. to 25° C. Thereafter, the reaction mixture was stirred at room temperature for 3 hours. The product precipitated was then separated by filtration and was washed with N,N-dimethylformamide three times, using 200 ml thereof at each time, and was then washed with water two times, using 200 ml thereof at each time. The product was dried by application of heat thereto under reduced pressure, whereby bisazo compound No. 1-66 shown in Table 3 was obtained. The yield was 1.67 g (86.5%). An infrared spectrum of this bisazo compound, taken by use of a KBr tablet, is shown in FIG. 3.

EXAMPLES 1-16~1-26

Example 1-15 was repeated except that the coupling component employed in Example 1-15 was replaced by the coupling components listed in Table 2, whereby bisazo compounds Nos. 1-68, 1-67, 1-44, 1-45, 1-41, 1-42, 1-43, 1-50, 1-47, 1-48 and 1-52 were prepared, which bisazo compounds are listed in Table 3.

TABLE 2

| Compound No. | Coupling Component | Compound No. | Coupling Component |
|---|---|---|---|
| 1-68 | HO, CONH—(ring)—OCH₃ (benzo[a]carbazole, HN) | 1-67 | HO, CONH—(ring)—OCH₃, CH₃ (benzo[a]carbazole, HN) |

TABLE 2-continued

| Compound No. | Coupling Component | Compound No. | Coupling Component |
|---|---|---|---|
| 1-44 | (structure: 2-hydroxy-N-(2-methoxyphenyl)-carbazole-carboxamide) | 1-45 | (structure: 2-hydroxy-N-(3-methoxyphenyl)-carbazole-carboxamide) |
| 1-41 | (structure: 2-hydroxy-N-(2-methylphenyl)-carbazole-carboxamide) | 1-42 | (structure: 2-hydroxy-N-(3-methylphenyl)-carbazole-carboxamide) |
| 1-43 | (structure: 2-hydroxy-N-(4-methylphenyl)-carbazole-carboxamide) | 1-50 | (structure: 2-hydroxy-N-(3-nitrophenyl)-carbazole-carboxamide) |
| 1-47 | (structure: 2-hydroxy-N-(3-chlorophenyl)-carbazole-carboxamide) | 1-48 | (structure: 2-hydroxy-N-(4-chlorophenyl)-carbazole-carboxamide) |

TABLE 2-continued

| Compound No. | Coupling Component | Compound No. | Coupling Component |
|---|---|---|---|
| 1-52 | (structure: naphthol with HO, CONH-phenyl-C₂H₅ group and fused indole NH ring system) | | |

TABLE 3

| Compound No. | Structure Formula of Bisazo Compounds | Elemental Value Calculated (%) | Found (%) | Infrared Spectra cm⁻¹ (KBr Method) νC=O |
|---|---|---|---|---|
| 1-1 | (bisazo structure with phenyl-HNOC, OH, naphthyl, N=N, phenyl-CH=CH-phenyl, N=N, naphthyl, OH, CONH-phenyl) | C 76.33<br>H 4.53<br>N 10.55 | 76.50<br>4.63<br>10.71 | 1680 |
| 1-29 | (bisazo structure with o-OCH₃-phenyl-HNOC, OH, naphthyl bridge with CH=CH, terminal OCH₃) | C 73.70<br>H 4.53<br>N 9.90 | 73.91<br>4.78<br>9.95 | 1670 |
| 1-3 | (bisazo structure with H₃CO-phenyl-HNOC end groups) | C 73.81<br>H 4.63<br>N 9.92 | 73.91<br>4.78<br>9.95 | 1675 |
| 1-2 | (bisazo structure with o-H₃C-phenyl-HNOC end groups) | C 76.53<br>H 4.79<br>N 10.18 | 76.82<br>4.97<br>10.34 | 1680 |
| 1-7 | (bisazo structure with p-H₃C-phenyl-HNOC end groups) | C 76.71<br>H 4.79<br>N 10.29 | 76.82<br>4.97<br>10.34 | 1680 |

TABLE 3-continued

| Compound No. | Structure Formula of Bisazo Compounds | Elemental Value | | | Infrared Spectra cm$^{-1}$ (KBr Method) $\nu$C=O |
|---|---|---|---|---|---|
| | | | Calculated (%) | Found (%) | |
| 1-4 | Cl–C$_6$H$_4$–HNOC, OH, –N=N–C$_6$H$_4$–(CH=CH)$_2$–C$_6$H$_4$–N=N–, HO, CONH–C$_6$H$_4$–Cl (naphthalene cores) | C<br>H<br>N | 70.21<br>3.97<br>9.68 | 70.32<br>4.02<br>9.84 | 1680 |
| 1-5 | O$_2$N-substituted (meta-NO$_2$ phenyl) analog | C<br>H<br>N | 68.42<br>3.82<br>12.60 | 68.63<br>3.92<br>12.81 | 1680 |
| 1-6 | O$_2$N–C$_6$H$_4$–HNOC... (para-NO$_2$ phenyl) analog | C<br>H<br>N | 68.40<br>3.93<br>12.51 | 68.63<br>3.92<br>12.81 | 1680 |
| 1-8 | H$_5$C$_2$O-substituted phenyl analog | C<br>H<br>N | 73.98<br>4.90<br>9.40 | 74.29<br>5.09<br>9.63 | 1675 |
| 1-19 | 2,5-di-OCH$_3$ phenyl analog | C<br>H<br>N | 71.43<br>4.90<br>9.18 | 71.66<br>4.91<br>9.29 | 1670 |
| 1-15 | 5-Cl-2-CH$_3$ phenyl analog | C<br>H<br>N | 70.69<br>4.31<br>9.29 | 70.81<br>4.35<br>9.53 | 1680 |
| 1-13 | 4-Cl-2-CH$_3$ phenyl analog | C<br>H<br>N | 70.80<br>4.31<br>9.50 | 70.81<br>4.35<br>9.53 | 1680 |
| 1-14 | 2,4-di-CH$_3$ phenyl analog | C<br>H<br>N | 76.90<br>5.21<br>9.76 | 77.11<br>5.28<br>9.99 | 1680 |

TABLE 3-continued

| Compound No. | Structure Formula of Bisazo Compounds | | Elemental Value Calculated (%) | Found (%) | Infrared Spectra cm$^{-1}$ (KBr Method) $\nu C=O$ |
|---|---|---|---|---|---|
| 1-21 | (structure) | C<br>H<br>N | 66.31<br>4.20<br>8.39 | 66.58<br>4.36<br>8.63 | 1675 |
| 1-66 | (structure) | C<br>H<br>N | 77.22<br>4.21<br>11.54 | 77.31<br>4.40<br>11.64 | 1670 |
| 1-68 | (structure) | C<br>H<br>N | 75.01<br>4.51<br>10.86 | 75.12<br>4.54<br>10.95 | 1670 |
| 1-67 | (structure) | C<br>H<br>N | 75.19<br>4.68<br>10.39 | 75.40<br>4.80<br>10.66 | 1670 |
| 1-44 | (structure) | C<br>H<br>N | 75.01<br>4.55<br>10.89 | 75.12<br>4.54<br>10.95 | 1670 |
| 1-45 | (structure) | C<br>H<br>N | 74.98<br>4.45<br>10.72 | 75.12<br>4.54<br>10.95 | 1670 |

TABLE 3-continued

| Compound No. | Structure Formula of Bisazo Compounds | | Elemental Value Calculated (%) | Found (%) | Infrared Spectra cm⁻¹ (KBr Method) $\nu C=O$ |
|---|---|---|---|---|---|
| 1-41 | | C<br>H<br>N | 77.31<br>4.49<br>11.09 | 77.55<br>4.69<br>11.31 | 1675 |
| 1-42 | | C<br>H<br>N | 77.25<br>4.48<br>11.11 | 77.55<br>4.69<br>11.31 | 1675 |
| 1-43 | | C<br>H<br>N | 77.43<br>4.48<br>11.16 | 77.55<br>4.69<br>11.31 | 1675 |
| 1-50 | | C<br>H<br>N | 70.60<br>3.72<br>13.18 | 70.71<br>3.84<br>13.30 | 1680 |
| 1-47 | | C<br>H<br>N | 72.09<br>3.91<br>10.82 | 72.15<br>3.91<br>10.86 | 1675 |
| 1-48 | | C<br>H<br>N | 71.97<br>3.80<br>10.61 | 72.15<br>3.91<br>10.86 | 1680 |

TABLE 3-continued

| Compound No. | Structure Formula of Bisazo Compounds | Elemental Value Calculated (%) | Found (%) | Infrared Spectra cm⁻¹ (KBr Method) νC=O |
|---|---|---|---|---|
| 1-52 |  | C 77.71<br>H 4.92<br>N 10.90 | 77.77<br>4.95<br>11.00 | 1670 |

Note:
Decomposition Point: 250° C. or more

A bisazo compound of the following formula

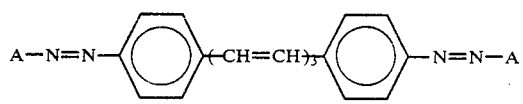 (I)-2 which corresponds to a bisazo compound of the previously described general formula (I) in which n=3 and the substituent A is the same as that defined in the general formula (I), can be prepared in the same manner as in the case of the bisazo compound with n=2.

A tetrazonium salt for use in preparing the above bisazo compound can be prepared by reducing, for example, 1,6-bis(4-nitrophenyl)-1,3,5-hexatriene to obtain 1,6-bis(4-aminophenyl)-1,3,5-hexatriene and by subjecting the thus obtained 1,6-bis(4-aminophenyl)-1,3,5-hexatriene to diazotization.

More specifically, 1,6-bis(4-aminophenyl)-1,3,5-hexatriene can be obtained by reducing 1,6-bis(4-nitrophenyl)-1,3,5-hexatriene in an organic solvent, such as N,N-dimethyl-formamide, in the presence of a reducing agent, such as a mixture of iron and hydrochloric acid, which 1,6-bis(4-nitrophenyl)-1,3,5-hexatriene can be prepared by the so-called Wittig-Horner reaction in which 5-(4-nitro-phenyl)-2,4-pentadienal is made to react with diethyl 4-nitrobenzyl-phosphonate. This reduction reaction terminates within a period of 30 minutes to 2 hours when the reaction temperature is maintained in the range of 70° C. to 120° C.

Diazotization of the thus prepared 1,6-bis(4-aminophenyl)-1,3,5-hexatriene is conducted as follows:

1,6-bis(4-aminophenyl)-1,3,5-hexatriene is added to a dilute inorganic acid, such as dilute hydrochloric acid or dilute sulfuric acid. To this mixture is added an aqueous solution of sodium nitrite, while maintaining the temperature of the reaction mixture in the range of −10° C. to 10° C. This diazotization reaction terminates in 30 minutes to 3 hours. It is preferable that the diazonium compound of 1,6-bis(4-aminophenyl)-1,3,5-hexatriene be separated in the form of a tetrazonium salt by adding, for example, fluoboric acid to the reaction mixture in order to precipitate the terazonium salt. The tetrazonium salt is then separated from the reaction mixture by filtration. To the thus obtained tetrazonium salt is added one of the previously described coupling components in an amount of 1 to 10 moles, preferably in an amount of 2 to 5 moles, with respect to one mole of the tetrazonium salt, so as to allow a coupling reaction. In practice, this coupling reaction is accomplished by dissolving both the tetrazonium salt and the coupling component in an organic solvent, such as N,N-dimethylformamide or dimethyl sulfoxide and then adding thereto dropwise an alkaline aqueous solution, such as an aqueous solution of sodium acetate, while maintaining the reaction mixture at temperatures between approximately −10° C. to 10° C. This reaction terminates within a period of 5 minutes to 30 minutes. Thus, a bisazo compound of the formula (I)-2 according to the present invention can be obtained.

Preparation of the bisazo compounds of the formula (I)-2 according to the present invention will now be described in more detail by referring to the following examples:

EXAMPLE 2-1

(1) Preparation of Diazonium Salt 14.0 g of 1,6-bis(4-aminophenyl)-1,3,5-hexatriene was added to a dilute sulfuric acid prepared by mixing 200 ml of water and 18 ml of concentrated sulfuric acid. The mixture was stirred at 60° C. for 30 minutes and was then cooled rapidly to −1° C. To the mixture, there was added dropwise with stirring, over a period of 50 minutes, an aqueous solution of sodium nitrite prepared by dissolving 8.10 g of sodium nitrite in 25 ml of water, while maintaining the reaction mixture at temperatures ranging from −1° C. to −2° C. The reaction mixture was further stirred at the same temperatures for 10 minutes.

Unreacted materials, which were small in amount, were removed from the reaction mixture by filtration. To the filtrate was then added 60 ml of a 42% fluoboric acid. Red crystals separated, which were collected on a suction funnel and washed with a small amount of methanol and dried, whereby the desired tetrazonium difluoroborate was obtained in the form of red needle-like crystals. The yield was 20.6 g (84.0%).

Figure 4:
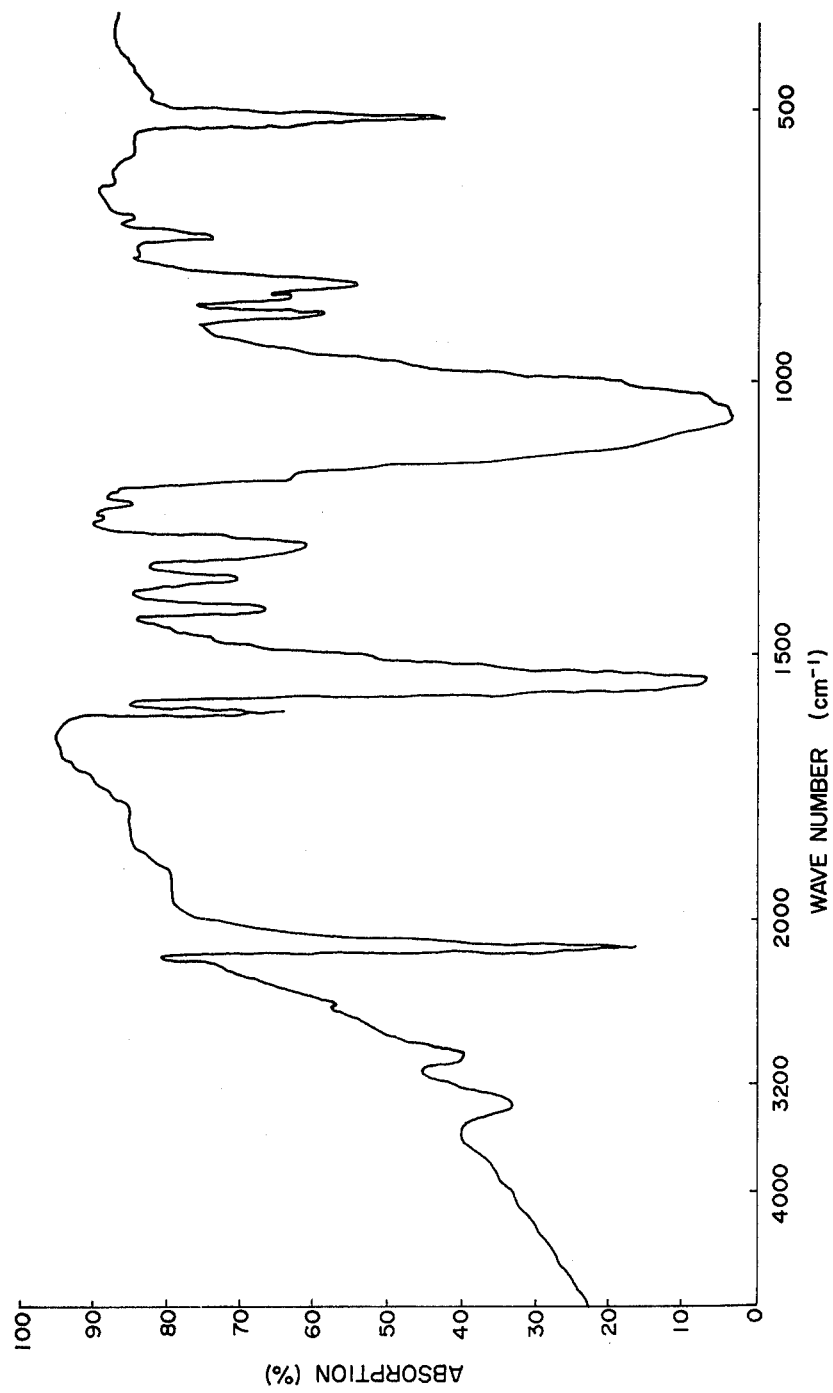
FIG. 4 is an infrared spectrum of a tetrazonium salt prepared in Example 2-1.

The decomposition point of the thus obtained tetrazonium salt was 113° C. An infrared spectrum of the tetrazonium salt taken by use of a KBr tablet indicated an infrared absorption at 2,200 cm$^{-1}$ which is characteristic of the —N≡N— bonds in the tetrazonium salt. This infrared spectrum is shown in FIG. 4.

(2) Preparation of Diazo Compound No. 2-1

1.11 g of 2-hydroxy-3-naphthoic acid anilide (a coupling component) was dissolved in 140 ml of N,N-dimethylformamide. To this solution, 0.97 g of the tetrazonium salt prepared in the above (1) was added. To the mixture, an aqueous solution of sodium acetate prepared by dissolving 0.69 g of sodium acetate in 7 ml of water was added dropwise over a period of 40 minutes, while the temperature of the reaction mixture was maintained at 22° C. to 26° C. After the dropwise addition of the sodium acetate aqueous solution, the reaction mixture was stirred at room temperature for 3 hours. Precipitates were formed, which were collected by filtration and were then washed with N,N-dimethylformamide three times, using 350 ml thereof at each time. The precipitates were then washed with water two times, using 200 ml thereof at each time. The thus purified precipitates were then dried under reduced pressure, with application of heat thereto, whereby a bisazo compound No. 2-1 shown in Table 6 was obtained. The yield was 1.35 g (83.3%).

Figure 5:
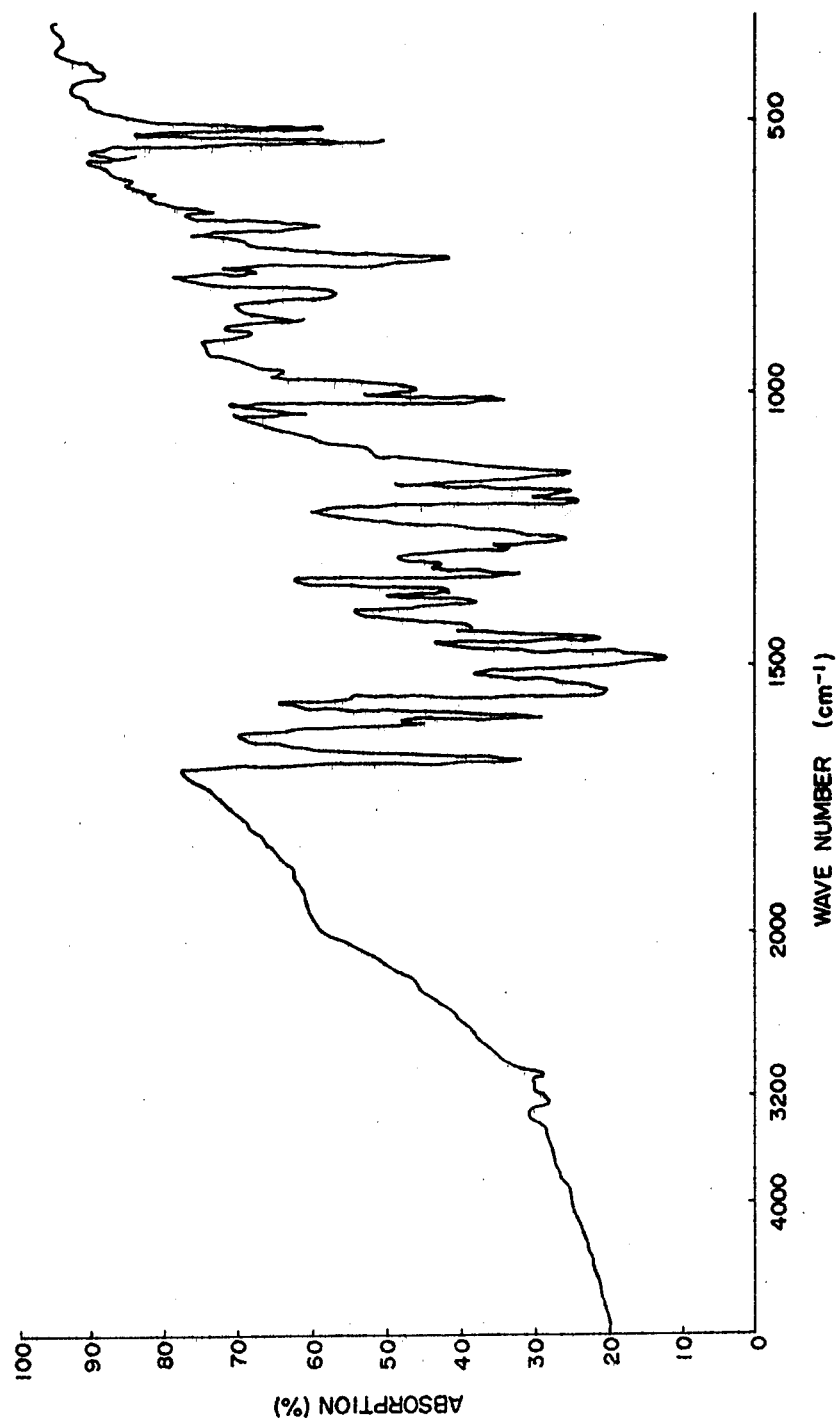
FIG. 5 is an infrared spectrum of a bisazo compound No. 2-1 prepared in Example 2-1.

An infrared spectrum of this bisazo compound, taken by use of a KBr tablet, indicated an infrared absorption at 1680 cm$^{-1}$ characteristic of the secondary amide, which infrared spectrum is shown in FIG. 5.

EXAMPLES 2-2~2-18

Example 2-1 was repeated except that the coupling component employed in Example 2-1 was replaced by the coupling components listed in Table 4, whereby bisazo compounds Nos. 2-29, 2-3, 2-2, 2-7, 2-4, 2-5, 2-6, 2-8, 2-19, 2-15, 2-13, 2-14, 2-16, 2-37, 2-38, 2-36 and 2-69 were prepared, which bisazo compounds are listed in Table 6.

TABLE 4

| Compound No. | Coupling Component | Compound No. | Coupling Component |
|---|---|---|---|
| 2-29 | HO, CONH—phenyl(OCH₃ ortho)—naphthalene | 2-3 | HO, CONH—phenyl—OCH₃ (para)—naphthalene |
| 2-2 | HO, CONH—phenyl(CH₃ ortho)—naphthalene | 2-7 | HO, CONH—phenyl—CH₃ (para)—naphthalene |
| 2-4 | HO, CONH—phenyl—Cl—naphthalene | 2-5 | HO, CONH—phenyl—NO₂ (meta)—naphthalene |
| 2-6 | HO, CONH—phenyl—NO₂—naphthalene | 2-8 | HO, CONH—phenyl(OC₂H₅ ortho)—naphthalene |

TABLE 4-continued
| Compound No. | Coupling Component | Compound No. | Coupling Component |
|---|---|---|---|
| 2-19 | 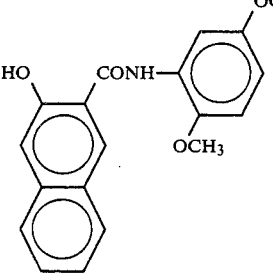 | 2-15 | 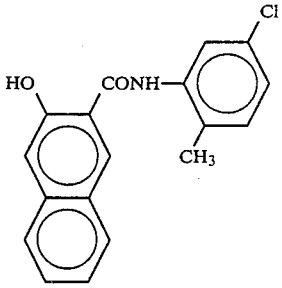 |
| 2-13 | 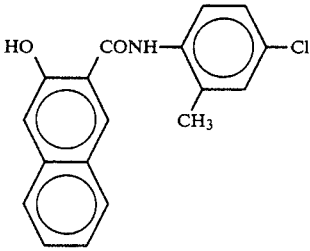 | 2-14 | 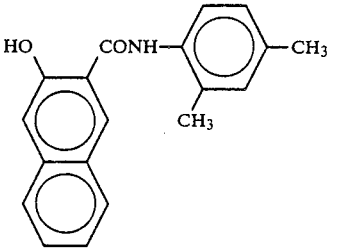 |
| 2-16 | 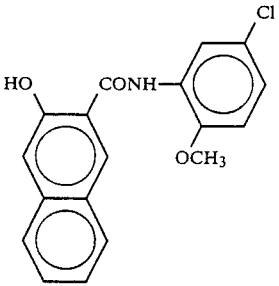 | 2-37 | 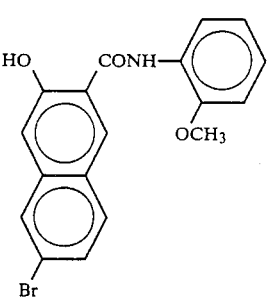 |
| 2-38 | 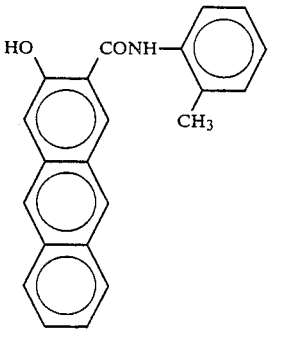 | 2-36 | 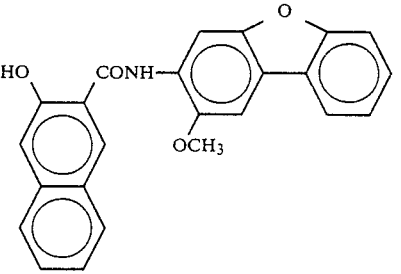 |
| 2-69 | 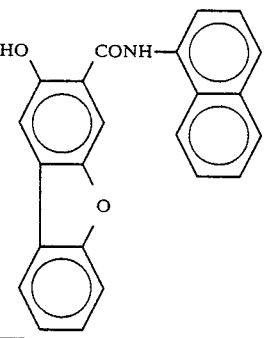 | | |

EXAMPLE 2-19

1.48 g of 2-hydroxy-3-phenylcarbamoyl-11H-benzo[a]carbazole (coupling component) was dissolved in 140 ml of N,N-dimethylformamide. To this solution, 0.92 g of the tetrazonium salt prepared in Example 2-1 was added. To the mixture, a sodium acetate aqueous solution prepared by dissolving 0.69 g of sodium acetate in 7 ml of water was added dropwise over a period of 5 minutes, while the temperature of the reaction mixture was maintained at 26° C. to 30° C. The reaction mixture was stirred at room temperature for 3 hours. Thereafter, the product precipitated was separated by filtration and was washed with N,N-dimethylformamide 4 times, using 200 ml thereof at each time, and was then washed with water 2 times, using 200 ml thereof at each time.

Figure 6:
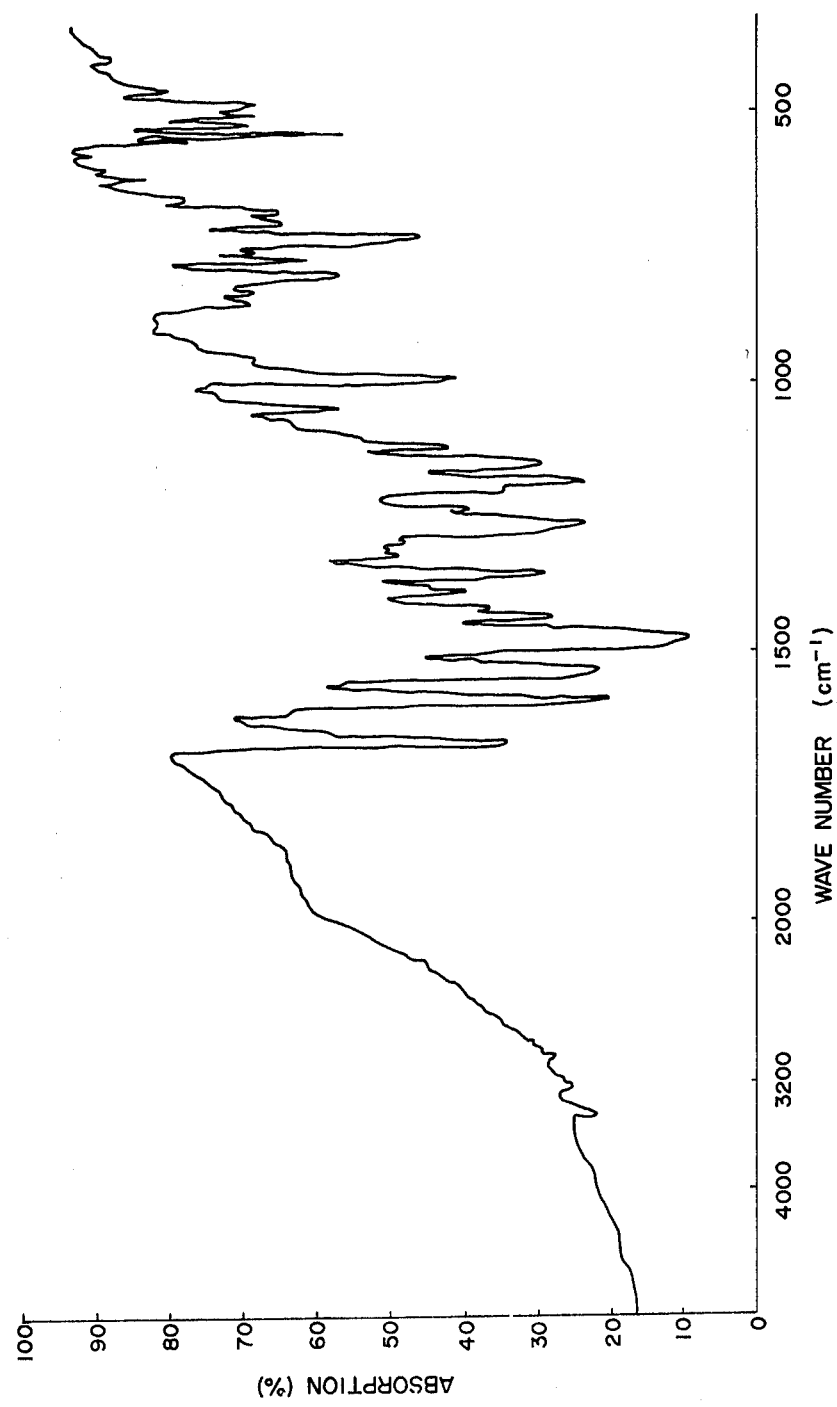
FIG. 6 is an infrared spectrum of a bisazo compound No. 2-66 prepared in Example 1-19.

The product was dried by application of heat thereto under reduced pressure, whereby a bisazo compound No. 2-66 shown in Table 6 was obtained. The yield was 1.65 g (83.3%). An infrared spectrum of this bisazo compound, taken by use of a KBr tablet, is shown in FIG. 6.

EXAMPLES 2-20~2-36

Example 2-19 was repeated except that the coupling component employed in Example 2-19 was replaced by the coupling components listed in Table 5, whereby bisazo compounds Nos. 2-68, 2-67, 2-44, 2-45, 2-41, 2-42, 2-43, 2-49, 2-50, 2-51, 2-46, 2-47, 2-48, 2-52, 2-56, 2-53 and 2-55 were prepared, which bisazo compounds are listed in Table 6.

TABLE 5

| Compound No. | Coupling Component | Compound No. | Coupling Component |
|---|---|---|---|
| 2-68 | (structure) | 2-67 | (structure) |
| 2-44 | (structure) | 2-45 | (structure) |
| 2-41 | (structure) | 2-42 | (structure) |

TABLE 5-continued

| Compound No. | Coupling Component |
|---|---|
| 2-43 | 3-hydroxy-N-(4-methylphenyl)-... (carbazole-fused naphthalene with CH₃) |
| 2-50 | 3-hydroxy-N-(3-nitrophenyl)-... (NO₂) |
| 2-46 | 3-hydroxy-N-(2-chlorophenyl)-... (Cl) |
| 2-48 | 3-hydroxy-N-(4-chlorophenyl)-... (Cl) |
| 2-49 | 3-hydroxy-N-(2-nitrophenyl)-... (NO₂) |
| 2-51 | 3-hydroxy-N-(4-nitrophenyl)-... (NO₂) |
| 2-47 | 3-hydroxy-N-(3-chlorophenyl)-... (Cl) |
| 2-52 | 3-hydroxy-N-(2-ethylphenyl)-... (C₂H₅) |

TABLE 5-continued

| Compound No. | Coupling Component |
|---|---|
| 2-56 | (2-hydroxy-N-(4-ethylphenyl)-carbazole-carboxamide structure) |
| 2-55 | (2-hydroxy-N-(4-ethoxyphenyl)-carbazole-carboxamide structure) |
| 2-53 | (2-hydroxy-N-(2-ethoxyphenyl)-carbazole-carboxamide structure) |

TABLE 6

| Compound No. | Structure Formula of Bisazo Compounds | (Decomposition Point) | Elemental Value | | | Infrared Spectra cm$^{-1}$ (KBr Method) $\nu C=O$ |
|---|---|---|---|---|---|---|
| | | | | Calculated (%) | Found (%) | |
| 2-1 | | (311° C.) | C H N | 76.89 4.61 10.14 | 77.01 4.73 10.37 | 1680 |
| 2-29 | | (307° C.) | C H N | 74.21 4.67 9.59 | 74.46 4.87 9.65 | 1675 |
| 2-3 | | (311° C.) | C H N | 74.57 4.78 9.42 | 74.46 4.87 9.65 | 1675 |
| 2-2 | | (306° C.) | C H N | 77.05 4.85 9.78 | 77.30 5.06 10.02 | 1680 |
| 2-7 | | (312° C.) | C H N | 77.05 4.96 9.86 | 77.30 5.06 10.02 | 1680 |

TABLE 6-continued

| Compound No. | Structure Formula of Bisazo Compounds | (Decomposition Point) | Elemental Value | | | Infrared Spectra cm⁻¹ (KBr Method) $\nu C=O$ |
|---|---|---|---|---|---|---|
| | | | | Calculated (%) | Found (%) | |
| 2-4 | [structure with Cl substituents] | (333° C.) | C H N | 71.05 3.89 9.46 | 70.97 4.13 9.55 | 1680 |
| 2-5 | [structure with NO₂ substituents] | (318° C.) | C H N | 68.95 3.80 12.19 | 69.32 4.04 12.44 | 1680 |
| 2-6 | [structure with NO₂ substituents] | (336° C.) | C H N | 69.09 3.82 12.20 | 69.32 4.04 12.44 | 1690 |
| 2-8 | [structure with OC₂H₅ substituents] | (320° C.) | C H N | 74.57 5.16 9.23 | 74.81 5.17 9.35 | 1675 |
| 2-19 | [structure with OCH₃ substituents] | (328° C.) | C H N | 72.01 4.78 8.91 | 72.23 4.99 9.03 | 1675 |

TABLE 6-continued

| Compound No. | Structure Formula of Bisazo Compounds | (Decomposition Point) | Elemental Value | | | Infrared Spectra cm$^{-1}$ (KBr Method) $\nu C=O$ |
|---|---|---|---|---|---|---|
| | | | | Calculated (%) | Found (%) | |
| 2-15 | | (321° C.) | C H N | 71.57 4.20 9.23 | 71.43 4.45 9.26 | 1680 |
| 2-13 | | (324° C.) | C H N | 71.66 4.20 9.09 | 71.43 4.45 9.26 | 1680 |
| 2-14 | | (316° C.) | C H N | 77.39 5.10 9.55 | 77.57 5.36 9.69 | 1680 |
| 2-16 | | (313° C.) | C H N | 68.78 4.21 8.79 | 69.00 4.30 8.94 | 1675 |
| 2-37 | | (319° C.) | C H N | 65.10 4.01 8.22 | 65.06 4.05 8.43 | 1675 |

TABLE 6-continued

Structure Formula of Bisazo Compounds

| Compound No. | (Decomposition Point) | Elemental Value | | | Infrared Spectra cm$^{-1}$ (KBr Method) $\nu$C=O |
|---|---|---|---|---|---|
| | | | Calculated (%) | Found (%) | |
| 2-38 | (309° C.) | C | 79.02 | 79.29 | 1670 |
| | | H | 4.71 | 4.95 | |
| | | N | 8.86 | 8.95 | |
| 2-36 | (321° C.) | C | 75.20 | 75.41 | 1680 |
| | | H | 4.30 | 4.42 | |
| | | N | 7.80 | 8.00 | |
| 2-69 | (324° C.) | C | 77.50 | 77.55 | 1675 |
| | | H | 4.24 | 4.28 | |
| | | N | 8.46 | 8.48 | |
| 2-66 | (336° C.) | C | 77.51 | 77.71 | 1675 |
| | | H | 4.40 | 4.49 | |
| | | N | 11.24 | 11.33 | |

TABLE 6-continued

| Compound No. | Structure Formula of Bisazo Compounds | (Decomposition Point) | Elemental Value | Calculated (%) | Found (%) | Infrared Spectra cm⁻¹ (KBr Method) $\nu C=O$ |
|---|---|---|---|---|---|---|
| 2-68 | (structure) | (304° C.) | C H N | 75.56 4.46 10.51 | 75.55 4.62 10.68 | 1670 |
| 2-67 | (structure) | (314° C.) | C H N | 75.52 4.64 10.29 | 75.81 4.88 10.40 | 1670 |
| 2-44 | (structure) | (316° C.) | C H N | 75.28 4.50 10.43 | 75.55 4.62 10.68 | 1675 |
| 2-45 | (structure) | (334° C.) | C H N | 75.54 4.43 10.42 | 75.55 4.62 10.68 | 1680 |

TABLE 6-continued

| Compound No. | Structure Formula of Bisazo Compounds | (Decomposition Point) | Elemental Value | | Infrared Spectra cm$^{-1}$ (KBr Method) $\nu C=O$ |
|---|---|---|---|---|---|
| | | | Calculated (%) | Found (%) | |
| 2-41 | | (312° C.) | C 77.66<br>H 4.59<br>N 10.94 | 77.92<br>4.77<br>11.02 | 1680 |
| 2-42 | | (335° C.) | C 77.83<br>H 4.60<br>N 10.75 | 77.92<br>4.77<br>11.02 | 1680 |
| 2-43 | | (318° C.) | C 78.02<br>H 4.68<br>N 10.84 | 77.92<br>4.77<br>11.02 | 1680 |
| 2-49 | | (334° C.) | C 70.95<br>H 3.71<br>N 12.72 | 71.23<br>3.93<br>12.98 | 1680 |

TABLE 6-continued

| Compound No. | Structure Formula of Bisazo Compounds | (Decomposition Point) | Elemental Value | Calculated (%) | Found (%) | Infrared Spectra cm$^{-1}$ (KBr Method) $\nu C=O$ |
|---|---|---|---|---|---|---|
| 2-50 | [structure with $O_2N$–C$_6$H$_4$–CONH– and –NH–CO–C$_6$H$_4$–NO$_2$, connected via naphthalene-azo-phenyl-(CH=CH)$_3$-phenyl-azo-naphthalene] | (341° C.) | C H N | 71.04 3.70 12.71 | 71.23 3.93 12.98 | 1680 |
| 2-51 | [structure with p-NO$_2$ substituents] | (353° C.) | C H N | 71.11 3.72 12.73 | 71.23 3.93 12.98 | 1690 |
| 2-46 | [structure with o-Cl substituents] | (338° C.) | C H N | 72.85 3.86 10.38 | 72.64 4.01 10.59 | 1680 |
| 2-47 | [structure with m-Cl substituents] | (338° C.) | C H N | 72.66 3.82 10.40 | 72.64 4.01 10.59 | 1680 |

TABLE 6-continued

| Compound No. | Structure Formula of Bisazo Compounds | (Decomposition Point) | Elemental Value Calculated (%) | Elemental Value Found (%) | Infrared Spectra cm$^{-1}$ (KBr Method) $\nu$C=O |
|---|---|---|---|---|---|
| 2-48 | [structure] | (337° C.) | C 72.57<br>H 3.80<br>N 10.31 | C 72.64<br>H 4.01<br>N 10.59 | 1675 |
| 2-52 | [structure] | (312° C.) | C 78.24<br>H 4.82<br>N 10.42 | C 78.13<br>H 5.02<br>N 10.72 | 1675 |
| 2-56 | [structure] | (337° C.) | C 77.95<br>H 4.91<br>N 10.54 | C 78.13<br>H 5.02<br>N 10.72 | 1675 |
| 2-53 | [structure] | (307° C.) | C 75.55<br>H 4.62<br>N 10.35 | C 75.81<br>H 4.88<br>N 10.40 | 1670 |

TABLE 6-continued
| Compound No. | Structure Formula of Bisazo Compounds | (Decomposition Point) | Elemental Value | | | Infrared Spectra cm⁻¹ (KBr Method) νC=O |
|---|---|---|---|---|---|---|
| | | | | Calculated (%) | Found (%) | |
| 2-55 | 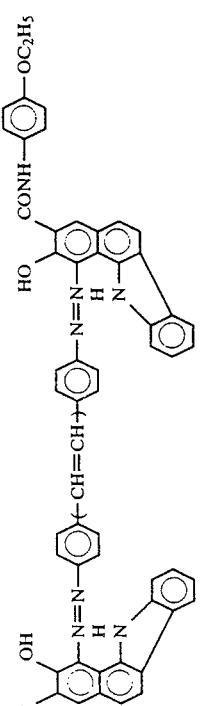 | (318° C.) | C<br>H<br>N | 75.63<br>4.75<br>10.28 | 75.81<br>4.88<br>10.40 | 1670 |

Electrophotographic photoconductors according to the present invention will now be explained, which contain any of the above-described novel bisazo compounds in the photoconductive layers thereof.

Figure 7:
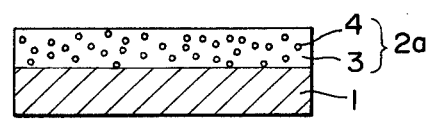
FIG. 7 is a schematic illustration in explanation of the structure of an electrophotographic photoconductor according to the present invention.
Figure 8:
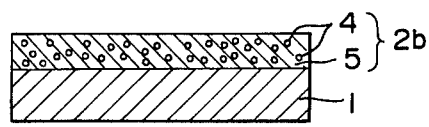
FIG. 8 is a schematic illustration in explanation of the structure of another electrophotographic photoconductor according to the present invention.
Figure 9:
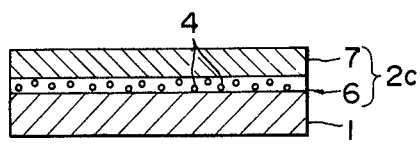
FIG. 9 is a schematic illustration in explanation of the structure of a further electrophotographic photoconductor according to the present invention.

Those photoconductors can be classified into three types in accordance with their structures as shown in FIGS. 7 to 9.

Referring to FIG. 7, there is shown an electrophotographic photoconductor comprising, on an electroconductive support material 1, a photoconductive layer 2a which comprises a bisazo compound 4 dispersed in a resinous binder material 3. In this electrophotographic photoconductor, the bisazo compound 4 works as a photoconductive material.

For the preparation of the photoconductor as shown in FIG. 7, the bisazo compound is ground to small particles with a diameter not greater than 5 $\mu$m, preferably not greater than 2 $\mu$m, by a ball mill or by other conventional grinding means, and the bisazo compound particles are dispersed in a solution of a binder agent. The bisazo compound dispersion is applied to the electroconductive support material by a conventional method, for instance, by use of a doctor blade or wire bar, and is then dried.

The thickness of the photoconductive layer 2a is in the range of approximately 3 $\mu$m to 50 $\mu$m, preferably in the range of 5 $\mu$m to 20 $\mu$m.

In the photoconductor as shown in FIG. 7, the photoconductive layer 2a contains 30 to 70 percent by weight of a bisazo compound, preferably about 50 percent by weight of the same.

In this photoconductor, it is preferable that the bisazo compound particles be present in contact with each other continuously through the photoconductive layer 2a, from the outer surface of the photoconductive layer 2a to the surface of the electroconductive support material 1, because the bisazo compound works as a photoconductive material, by which bisazo compound charge carriers necessary for the light-decay of the photoconductor are formed and through which bisazo compound the charge carriers are transported across the photoconductive layer 2a. In this sense, the greater the content of the bisazo compound in the photoconductive layer 2a, the better the photoconductor in terms of its photoconductive properties. However, in view of the required strength and photosensitivity of the photoconductor, it is most preferable that the photoconductive layer 2a contain approximately 50 percent by weight of the bisazo compound.

Referring to FIG. 8, there is shown another electrophotographic photoconductor according to the present invention, which comprises, on the electroconductive support material 1, a photoconductive layer 2b which comprises the bisazo compound 4 and a charge transporting medium 5 which is a mixture of a charge transporting material and a resinous binder material.

For the preparation of the photoconductor as shown in FIG. 8, the bisazo compound is ground to small particles with a diameter not greater than 5 $\mu$m, preferably not greater than 2 $\mu$m. The finely ground bisazo compound is dispersed in a solution of a charge transporting material and a binder agent. The content of the bisazo compound in the photoconductive layer 2a is 50 percent by weight or less, while the content of the charge transporting material is in the range of about 10 to 95 percent by weight, preferably in the range of about 30 to 90 percent by weight. The dispersion is applied to the electroconductive support material 1 and is then dried.

The thickness of the photoconductive layer 2b in FIG. 8 is in the range of approximately 3 $\mu$m to 50 $\mu$m, preferably in the range of 5 $\mu$m to 20 $\mu$m.

In the photoconductor as shown in FIG. 8, the charge transporting material constitutes a charge transporting medium in combination with the binder material and, when necessary, a plasticizer is added thereto, while the bisazo compound works as the charge carrier producing material. In this photoconductor, the charge carriers which are required for the light-decay of the photoconductor are produced by the bisazo compound, while the produced charge carriers are transported through the charge transporting medium.

Furthermore, in the photoconductor in FIG. 8, it is required that the absorption wavelength range of the charge transporting medium and that of the employed bisazo compound not overlap. More specifically, when visible light is employed for electrostatic latent image formation, it is required that the charge transporting medium be transparent with respect to visible light, allowing visible light to be transmitted without absorption thereof, in order that enough visible light reach the surface of the bisazo compound and cause the bisazo compound to produce charge carriers efficiently.

In any case, it is a fundamental requirement that the absorption wavelength range of the charge transporting medium and that of the employed bisazo compound not overlap in the particular absorption wavelength range corresponding to the desired photosensitive range of the photoconductor.

Referring to FIG. 9, there is shown a further electrophotographic photoconductor according to the present invention, which is a modification of the photoconductor shown in FIG. 8. In this photoconductor, a photoconductive layer 2c comprises a charge carrier producing layer 6 consisting essentially of the bisazo compound 4, and a charge transporting layer 7.

For the preparation of the photoconductor as shown in FIG. 9, the bisazo compound is deposited in a vacuum on an electroconductive support material 1, or the bisazo compound is ground to small particles with a diameter not greater than 5 $\mu$m, preferably not greater than 2 $\mu$m, and is then dispersed in a solvent, when necessary, with addition of a binder agent thereto, and the dispersion is applied to the electroconductive support material 1 and is then dried. When necessary, the surface of the bisazo compound layer which is the charge carrier producing layer 6 is polished or its thickness is adjusted to an appropriate thickness by buffing the bisazo compound layer or by other conventional methods. Thereafter, a solution of a charge transporting material and a binder agent is applied to the bisazo compound layer and is then dried. Thus, a layered photoconductor as shown in FIG. 9 can be prepared.

In the photoconductor as shown in FIG. 9, the thickness of the charge carrier producing layer 6 is 5 $\mu$m or less, preferably 3 $\mu$m or less, while the thickness of the charge transporting layer 7 is in the range of approximately 3 $\mu$m to 50 $\mu$m, preferably in the range of 5 $\mu$m to 20 $\mu$m.

In the photoconductor as shown in FIG. 9, the content of the charge transporting material in the charge transporting layer 7 is in the range of about 10 to 95 percent by weight, preferably in the range of about 30 to 90 percent by weight.

In the photoconductor as shown in FIG. 9, light that passes through the charge transporting layer 7 reaches the charge carrier producing layer 6, in which charge carrier producing layer 6 charge carriers are produced by the bisazo compound 4. The charge transporting layer 7 receives the thus produced charge carriers injected thereto and transports the same. Therefore, the photoconductor as shown in FIG. 9 is the same as that shown in FIG. 8 in the sense that charge carriers required for the light-decay of the photoconductor are generated by the bisazo compound 4 and the charge carriers are transported through the charge transporting medium.

When preparing the photoconductors in FIGS. 7 through 9, a plasticizer can be employed together with a binder agent.

As the electroconductive support material for use in the photoconductors according to the present invention, a metal plate or metal foil, for example, an aluminum plate or aluminum foil; a metal-evaporated plastic film, for example, an aluminum-evaporated plastic film; or a paper treated so as to be electroconductive, can be employed.

As the binder materials for use in the present invention, the following resins can be employed: condensation resins, such as polyamide, polyurethane, polyester resin, epoxy resin, polyketone, polycarbonate; vinyl polymers, such as polyvinylketone, polystyrene, poly-N-vinylcarbazole, polyacrylamide resins, and other electrically insulating and adhesive resins.

As the plasticizers for use in the present invention, halogenated paraffin, polybiphenyl chloride, dimethylnaphthalene and dibutyl phthalate can be employed.

As the charge transporting materials for use in the present invention, the following polymers and monomers can be employed: Vinyl polymers, such as poly-N-vinylcarbazole, halogenated poly-N-vinylcarbazole, polyvinyl pyrene, polyvinyl indoloquinoxaline, polyvinyl dibenzothiophene, polyvinyl anthracene, polyvinyl acridine; condensation resins, such as pyrene-formaldehyde resin, bromopyreneformaldehyde resin, ethylcarbazole-formaldehyde resin, chloroethylcarbazole-formaldehyde resin; monomers, such as fluorenone, 2-nitro-9-fluorenone, 2,7-dinitro-9-fluorenone, 2,4,7-trinitro-9-fluorenone, 2,4,5,7-tetranitro-9-fluorenone, 4H-indeno[1,2-b]thiophene-4-one, 2-nitro-4H-indeno[1,2-b]thiophene-4-one, 2,6,8-trinitro-4H-indeno[1,2-b]thiophene-4-one, 4H-indeno[2,1-b]thiophene-8-one, 2-nitro-8H-indeno[2,1-b]thiophene-8-one, 2-bromo-6,8-dinitro-4H-indeno[1,2-b]thiophene, 6,8-dinitro-4H-indeno[1,2-b]thiophene, 2-nitro-dibenzothiophene, 2,8-dinitrodibenzothiophene, 3-nitro-dibenzothiophene-5-oxide, 3,7-dinitro-dibenzothiophene-5-oxide, 1,3,7-trinitrodibenzothiophene-5,5-dioxide, 3-nitro-dibenzothiophene-5,5-dioxide, 3,7-dinitro-dibenzothiophene-5,5-dioxide, 4-dicyanomethylene-4H-indeno[1,2-b]thiophene, 6,8-dinitro-4-dicyanomethylene-4H-indeno[1,2-b]thiophene, 1,3,7,9-tetranitrobenzo[c]cinnoline-6-oxide, 2,4,10-trinitrobenzo[c]cinnoline-6-oxide, 2,4,8-trinitrobenzo[c]cinnoline-6-oxide, 2,4,8-trinitrothioxanthone, 2,4,7-trinitro-9,10-phenanthrenequinone, 1,4-naphthoquinonebenzo[a]anthracene-7,12-dione, 2,4,7-trinitro-9-dicyano-methylene fluorene, tetrachlorophthalic anhydride, 1-bromopyrene, 1-methylpyrene, 1-ethylpyrene, 1-acetylpyrene, carbazole, N-ethylcarbazole, N-$\beta$-chloroethylcarbazole, N-$\beta$-hydroxyethylcarbazole, 2-phenylindole, 2-phenylnaphthalene, 2,5-bis(4-diethylaminophenyl)-1,3,4-oxadiazole, 2,5-bis(4-diethylaminophenyl)-1,3,4-triazole, 1-phenyl-3-(4-diethylaminostyryl)-5-(4-diethylaminophenyl)-pyrazoline, 2-phenyl-4-(4-diethylaminophenyl)-5-phenyloxazole, triphenylamine, tris(4-diethylaminophenyl)methane, 8,6-bis(dibenzylamino)-9-ethylcarbazole, 4,4'-bis(dibenzylamino)diphenylmethane, 4,4'-bis(dibenzylamino)-diphenyl ether, 1,1-bis(4-dibenzylaminophenyl)propane, 2-($\alpha$-naphthyl)-5-(4-diethylaminophenyl)-1,3,4-oxadiazole, 2-styryl-5-(3-N-ethylcarbazolyl)-1,3,4-oxadiazole, 2-(4-methoxyphenyl)-5-(3-N-ethylcarbazolyl)-1,3,4-oxadiazole, 2-(4-diethylaminophenyl)-5-(3-N-ethylcarbazolyl)-1,3,4-oxadiazole, 9-(4-diethylaminostyryl)anthracene, 9-(4-dimethylaminostyryl)anthracene, $\alpha$-(9-anthryl)-$\beta$-(3-N-ethylcarbazolyl)ethylene, 5-methyl-2-(4-diethylaminostyryl)benzoxazole, 9-(4-dimethylamino-benzylidene)fluorenone, N-ethyl-3-(9-fluorenylidene)carbazole, 2,6-bis(4-diethylaminostyryl)pyridine, methylphenylhydrazono-3-methylidene-9-ethylcarbazole, methylphenylhydrazono-4-methylidene-N,N-diethylaniline, 4-N,N-diphenylaminostilbene, and $\alpha$-phenyl-4'-N,N-diphenylaminostilbene.

These charge transporting materials can be employed alone or in combination with two or more charge transporting materials.

In the photoconductors according to the present invention, an adhesive layer or a barrier layer can be interposed between the electroconductive support material and the photoconductive layer when necessary. The materials suitable for preparing the adhesive layer or barrier layer are polyamide, nitrocellulose and aluminum oxide. It is preferable that the thickness of the adhesive layer or barrier layer be 1 $\mu$m or less.

Copying by use of the photoconductors according to the present invention can be performed by the process comprising the steps of electrically charging the surface of the photoconductive layer, and exposing the charged surface to a light image to form a latent electrostatic image thereof on the surface, and developing the latent image with developer. When necessary, the developed image is transferred to paper or other materials and is then fixed thereto.

EXAMPLE 1-27

This is an example of an electrophotographic photoconductor according to the present invention, in which the aforementioned bisazo compound No. 1-66 in Table 3 was employed.

A mixture of 1 part by weight of a polyester resin (Trade Name: Polyester Adhesive 49000 made by Du Pont), 1 part by weight of the bisazo compound No. 1-66, and 26 parts by weight of tetrahydrofuran was ground in a ball mill. This dispersion was coated on an aluminum-evaporated polyester film by a doctor blade and was then dried at 100° C. for 10 minutes, so that a photoconductive layer with a thickness of 7 $\mu$m was formed on the aluminum-evaporated polyester film, forming an electrophotographic photoconductor of the type as shown in FIG. 7.

The surface of the photoconductive layer of the electrophotographic photoconductor was charged positively in the dark under application of +6 KV of corona charge for 20 seconds by a commercially available electrostatic copying sheet testing apparatus and was then allowed to stand in the dark for 20 seconds without applying any charge thereto, and the surface potential Vpo (V) of the photoconductor was measured. The photoconductor was then illuminated by a tungsten lamp in such a manner that the illuminance on the illuminated surface of the photoconductor was 20 lux, and the exposure $E_{\frac{1}{2}}$ (lux.sec) required to reduce the initial surface potential Vpo (V) to ½ the initial surface potential Vpo (V) was measured. The result showed that Vpo was 110 V and $E_{\frac{1}{2}}$ was 11.2 lux.sec.

EXAMPLE 1-28

A mixture of 2 parts by weight of the bisazo compound No. 1-1, and 98 parts by weight of tetrahydrofuran was ground in a ball mill. The thus prepared dispersion was coated on an aluminum surface side of an aluminum-evaporated polyester film by a doctor blade and was then dried at room temperature, so that a charge carrier producing layer with a thickness of 1 μm was formed on the aluminum-evaporated polyester film.

Further, 2 parts by weight of 9-(4-diethylaminostyryl)anthracene, 2 parts by weight of a polycarbonate resin (Trade Name: Panlite L made by Teijin Limited) and 16 parts by weight of tetrahydrofuran were mixed to form a solution. This solution was coated on the charge carrier producing layer by a doctor blade and was then dried at 120° C. for 10 minutes, so that a charge transporting layer with a thickness of 11 μm was formed on the charge carrier producing layer, whereby a layered type electrophotographic photoconductor as shown in FIG. 9 was prepared.

The surface of the photoconductive layer of the photoconductor was charged negatively in the dark under application of −6 KV of corona charge for 20 seconds by a commercially available electrostatic copying sheet testing apparatus and was then allowed to stand in the dark for 20 seconds without applying any charge thereto, and the surface potential Vpo (V) of the photoconductor was measured. The photoconductor was then illuminated by a tungsten lamp in such a manner that the illuminance on the illuminated surface of the photoconductor was 20 lux, and the exposure $E_{\frac{1}{2}}$ (lux.-sec) required to reduce the initial surface potential Vpo (V) to ½ the initial surface potential Vpo (V) was measured. The results showed that Vpo was −895 V and $E_{\frac{1}{2}}$ was 7.2 lux.sec.

EXAMPLE 1-29~1-33

Example 1-28 was repeated except that the bisazo compound No. 1-1 employed in Example 1-28 was replaced by the bisazo compounds listed in the following Table 7, whereby the photoconductors of the type shown in FIG. 9 were prepared. Vpo and $E_{\frac{1}{2}}$ of each of the photoconductors were measured in the same manner as in Example 1-28. The results are shown in Table 7.

TABLE 7

| Example No. | Bisazo Compound No. | Vpo (volt) | $E_{\frac{1}{2}}$ (lux · sec) |
|---|---|---|---|
| 1-29 | 1-15 | −1120 | 5.2 |
| 1-30 | 1-66 | −1060 | 7.4 |
| 1-31 | 1-68 | −970 | 4.9 |
| 1-32 | 1-79 | −1230 | 9.5 |
| 1-33 | 1-137 | −1000 | 11.2 |

EXAMPLE 1-34

A mixture of 1 part by weight of the bisazo compound No. 1-1 and 66 parts by weight of a polyester resin tetrahydrofuran solution containing 0.5 wt.% of a polyester resin (Vylon 200 made by Toyobo Company, Ltd.) was ground in a ball mill. The thus prepared dispersion was coated on an aluminum surface side of an aluminum-evaporated polyester film by a doctor blade and was then dried at 80° C. for 2 minutes, so that a charge carrier producing layer with a thickness of 0.7 μm was formed on the aluminum-evaporated polyester film.

Furthermore, 2 parts by weight of 1,1-bis(4-dibenzylaminophenyl)propane, 2 parts by weight of a polycarbonate resin (Trade Name: Panlite K-1300 made by Teijin Limited) and 16 parts by weight of tetrahydrofuran were mixed to form a solution. This solution was coated on the charge carrier producing layer by a doctor blade and was then dried at 120° C. for 10 minutes, so that a charge transporting layer with a thickness of 13 μm was formed on the charge carrier producing layer, whereby a layered type photoconductor as shown in FIG. 9 was prepared.

Vpo and $E_{\frac{1}{2}}$ of this photoconductor were measured in the same manner as that in Example 1-28. The result showed that Vpo was −1020 V and $E_{\frac{1}{2}}$ was 11.0 lux.sec.

EXAMPLE 1-35~1-39

Example 1-34 was repeated except that the bisazo compound No. 1-1 employed in Example 1-34 was replaced by the bisazo compounds listed in the following table 8, whereby the photoconductors of the type shown in FIG. 9 were prepared. Vpo and $E_{\frac{1}{2}}$ of each of the photoconductors were measured in the same manner as in Example 1-34. The results are shown in Table 8.

TABLE 8

| Example No. | Bisazo Compound No. | Vpo (volt) | $E_{\frac{1}{2}}$ (lux · sec) |
|---|---|---|---|
| 1-35 | 1-7 | −1150 | 9.5 |
| 1-36 | 1-66 | −1200 | 12.0 |
| 1-37 | 1-67 | −1020 | 11.0 |
| 1-38 | 1-95 | −1310 | 10.9 |
| 1-39 | 1-137 | −990 | 13.0 |

EXAMPLE 1-40

A mixture of 2 parts by weight of the bisazo compound No. 1-1 and 70 parts by weight of tetrahydrofuran was ground in a ball mill. The thus prepared dispersion was coated on an aluminum surface side of an aluminum-evaporated polyester film by a doctor blade and was then dried at room temperature, so that a charge carrier producing layer with a thickness of 1.5 μm was formed on the aluminum-evaporated polyester film.

Furthermore, 2 parts by weight of 1-phenyl-3-(4-diethylaminostyryl)-5-(4-diethylaminophenyl)pyrazoline, 3 parts by weight of polystyrene (Trade Name: Toporex made by Mitsui Toatsu Chemicals, Inc.) and 17 parts by weight of tetrahydrofuran were mixed to form a solution. This solution was coated on the charge carrier producing layer by a doctor blade and was then dried at 120° C. for 10 minutes, so that a charge transporting layer with a thickness of 16 μm was formed on the charge carrier producing layer, whereby a layered-type photoconductor as shown in FIG. 9 was prepared.

Vpo and $E_{\frac{1}{2}}$ of this photoconductor were measured in the same manner as that in Example 1-28. The result showed that Vpo was −630 V and $E_{\frac{1}{2}}$ was 2.9 lux.sec.

EXAMPLE 1-41~1-45

Example 1-40 was repeated except that the bisazo compound No. 1-1 employed in Example 1-40 was replaced by the bisazo compounds listed in the following table 9, whereby the photoconductors of the type shown in FIG. 9 were prepared. Vpo and $E_{\frac{1}{2}}$ of each of the photoconductors were measured in the same manner as in Example 1-34. The results are also shown in Table 9.

TABLE 9

| Example No. | Bisazo Compound No. | Vpo (volt) | $E_{\frac{1}{2}}$ (lux · sec) |
|---|---|---|---|
| 1-41 | 1-12 | −790 | 2.4 |
| 1-42 | 1-14 | −570 | 1.9 |
| 1-43 | 1-15 | −1010 | 2.8 |
| 1-44 | 1-38 | −1220 | 7.9 |
| 1-45 | 1-66 | −910 | 5.1 |

EXAMPLE 1-46

A mixture of 2 parts by weight of the bisazo compound No. 1-1 and 98 parts by weight of tetrahydrofuran was ground in a ball mill. The thus prepared dispersion was coated on an aluminum surface side of an aluminum-evaporated polyester film by a doctor blade and was then dried at room temperature, so that a charge carrier producing layer with a thickness of 1.0 μm was formed on the aluminum-evaporated polyester film.

Furthermore, 2 parts by weight of methylphenylhydrazone-3-methylidene-9-ethylcarbazole, 1 part by weight of poly-N-vinylcarbazole (Trade Name: Rubican M-170 made by BASF), 1 part by weight of a polyester resin (Vylon 200 made by Toyobo Company, Ltd.) and 18 parts by weight of tetrahydrofuran were mixed to form a solution. This solution was coated on the charge carrier producing layer by a doctor blade and was then dried at 120° C. for 10 minutes, so that a charge transporting layer with a thickness of 16 μm was formed on the charge carrier producing layer, whereby a layered-type photoconductor as shown in FIG. 9 was prepared.

Vpo and $E_{\frac{1}{2}}$ of this photoconductor were measured in the same manner as in Example 1-28. The result showed that Vpo was −920 V and $E_{\frac{1}{2}}$ was 7.5 lux.sec.

EXAMPLE 1-47 ~ 1-51

Example 1-46 was repeated except that the bisazo compound No. 1-1 employed in Example 1-46 was replaced by the bisazo compounds listed in the following table 10, whereby the photoconductors of the type shown in FIG. 9 were prepared. Vpo and $E_{\frac{1}{2}}$ of each of the photoconductors were measured in the same manner as in Example 1-28. The results are shown in Table 10.

TABLE 10

| Example No. | Bisazo Compound No. | Vpo (volt) | $E_{\frac{1}{2}}$ (lux · sec) |
|---|---|---|---|
| 1-47 | 1-7 | −1020 | 5.7 |
| 1-48 | 1-13 | −1210 | 5.0 |
| 1-49 | 1-66 | −1130 | 7.7 |
| 1-50 | 1-68 | −980 | 4.9 |
| 1-51 | 1-131 | −1010 | 7.7 |

EXAMPLE 1-52

A mixture of 10 parts by weight of a polyester resin (Trade Name: Vylon 200 made by Toyobo Company, Ltd.), 10 parts by weight of 2,5-bis(4-diethylaminophenyl)-1,3,4-oxadiazole, 2 parts by weight of the bisazo compound No. 1-1 and 108 parts by weight of tetrahydrofuran was ground in a ball mill. The thus prepared dispersion was coated on an aluminum surface side of an aluminum-evaporated polyester film by a doctor blade and was then dried at 120° C. for 10 minutes, so that a photoconductive layer with a thickness of 21 μm was formed on the aluminum-evaporated polyester film, whereby an electrophotographic element as shown in FIG. 8 was prepared.

Vpo and $E_{\frac{1}{2}}$ of this photoconductor were measured in the same manner as in Example 1-28, except that the photoconductor was positively charged in the dark under application of +6 KV of corona charge. The result showed that Vpo was +120 V and $E_{\frac{1}{2}}$ was 13.1 lux.sec.

EXAMPLE 1-53 ~ 1-57

Example 1-52 was repeated except that the bisazo compound No. 1-1 employed in Example 1-52 was replaced by the bisazo compounds listed in the following table 11, whereby the photoconductors of the type shown in FIG. 8 were prepared. Vpo and $E_{\frac{1}{2}}$ of each of the photoconductors were measured in the same manner as in Example 1-52. The results are shown in Table 11.

TABLE 11

| Example No. | Bisazo Compound No. | Vpo (volt) | $E_{\frac{1}{2}}$ (lux · sec) |
|---|---|---|---|
| 1-53 | 1-20 | +1100 | 9.8 |
| 1-54 | 1-66 | +1180 | 10.9 |
| 1-55 | 1-48 | +1200 | 11.5 |
| 1-56 | 1-80 | +1220 | 10.0 |
| 1-57 | 1-130 | +1290 | 12.9 |

EXAMPLE 1-58

A mixture of 1 part by weight of a polyester resin (Trade Name: Polyester Adhesive 49000 made by Du Pont), 1 part by weight of the bisazo compound No. 1-1, and 26 parts by weight of the bisazo compound No. 1-1, and 26 parts by weight of tetrahydrofuran was ground in a ball mill. This dispersion was coated on an aluminum-evaporated polyester film by a doctor blade and was then dried at 100° C. for 10 minutes, so that a photoconductive layer with a thickness of 7 μm was formed on the aluminum-evaporated polyester film, forming an electrophotographic photoconductor of the type as shown in FIG. 7.

Vpo and $E_{\frac{1}{2}}$ of this photoconductor were measured in the same manner as in Example 1-28, except that the photoconductor was positively charged in the dark under application of +6 KV of corona charge. The result showed that Vpo was +520 V and $E_{\frac{1}{2}}$ was 18.3 lux.sec.

EXAMPLE 1-59 ~ 1-63

Example 1-58 was repeated except that the bisazo compound No. 1-1 employed in Example 1-58 was replaced by the bisazo compounds listed in the following table 12, whereby the photoconductors of the type shown in FIG. 7 were prepared. Vpo and $E_{\frac{1}{2}}$ of each of the photoconductors were measured in the same manner as in Example 1-58. The results are shown in Table 12.

TABLE 12

| Example No. | Bisazo Compound No. | Vpo (volt) | $E_{\frac{1}{2}}$ (lux · sec) |
|---|---|---|---|
| 1-59 | 1-2 | +420 | 9.5 |
| 1-60 | 1-5 | +230 | 18.0 |
| 1-61 | 1-66 | +620 | 17.0 |

TABLE 12-continued

| Example No. | Bisazo Compound No. | Vpo (volt) | E½ (lux · sec) |
|---|---|---|---|
| 1-62 | 1-67 | +730 | 12.0 |
| 1-63 | 1-48 | +510 | 11.0 |

EXAMPLE 2-37

A mixture of 1 part by weight of a polyester resin (Trade Name: Polyester Adhesive 49000 made by Du Pont), 1 part by weight of the bisazo compound No. 2-66, and 26 parts by weight of tetrahydrofuran was ground in a ball mill. This dispersion was coated on an aluminum-evaporated polyester film by a doctor blade and was then dried at 100° C. for 10 minutes, so that a photoconductive layer with a thickness of 7 μm was formed on the aluminum-evaporated polyester film, forming an electrophotographic photo-conductor of the type as shown in FIG. 7.

The surface of the photoconductive layer of the electrophotographic photoconductor was charged positively in the dark under application of +6 KV of corona charge for 20 seconds by a commercially available electrostatic copying sheet testing apparatus and was then allowed to stand in the dark for 20 seconds without applying any charge thereto, and the surface potential Vpo (V) of the photoconductor was measured. The photoconductor was then illuminated by a tungsten lamp in such a manner that the illuminance on the illuminated surface of the photoconductor was 20 lux, and the exposure E½ (lux.sec) required to reduce the initial surface potential Vpo (V) to ½ the initial surface potential Vpo (V) was measured. The result showed that Vpo was +95 V and E½ was 9.6 lux.sec.

EXAMPLE 2-38

A mixture of 2 parts by weight of the bisazo compound No. 2-5 and 98 parts by weight of tetrahydrofuran was ground in a ball mill. The thus prepared dispersion was coated on an aluminum surface side of an aluminum-evaporated polyester film by a doctor blade and was then dried at room temperature, so that a charge producing layer with a thickness of 1 μm was formed on the aluminum-evaporated polyester film.

Further, 2 parts by weight of 9-(4-diethylaminostyryl) anthracene, 2 parts by weight of a polycarbonate resin (Trade Name: Panlite L made by Teijin Limited) and 16 parts by weight of tetrahydrofuran were mixed to form a solution. This solution was coated on the charge carrier producing layer by a doctor blade and was then dried at 120° C. for 10 minutes, so that a charge transporting layer with a thickness of 11 μm was formed on the charge carrier producing layer, whereby a layered type electrophotographic photoconductor as shown in FIG. 9 was prepared.

The surface of the photoconductive layer of the photoconductor was charged negatively in the dark under application of −6 KV of corona charge for 20 seconds by a commercially available electrostatic copying sheet testing apparatus and was then allowed to stand in the dark for 20 seconds without applying any charge thereto, and the surface potential Vpo (V) of the photoconductor was measured. The photoconductor was then illuminated by a tungsten lamp in such a manner that the illuminance on the illuminated surface of the photoconductor was 20 lux, and the exposure E½ (lux.-sec) required to reduce the initial surface potential Vpo (V) to ½ the initial surface potential Vpo (V) was measured. The results showed that Vpo was −920 V and E½ was 1.8 lux.sec.

EXAMPLE 2-39~2-43

Example 2-38 was repeated except that the bisazo compound No. 2-5 employed in Example 2-38 was replaced by the bisazo compounds listed in the following Table 13, whereby the photoconductors of the type shown in FIG. 9 were prepared. Vpo and E½ of each of the photoconductors were measured in the same manner as in Example 2-38. The results are shown in Table 13.

TABLE 13

| Example No. | Bisazo Compound No. | Vpo (volt) | E½ (lux · sec) |
|---|---|---|---|
| 2-39 | 2-16 | −810 | 2.0 |
| 2-40 | 2-66 | −840 | 0.9 |
| 2-41 | 2-48 | −650 | 0.7 |
| 2-42 | 2-43 | −920 | 0.8 |
| 2-43 | 2-47 | −820 | 0.8 |

EXAMPLE 2-44

A mixture of 1 part by weight of the bisazo compound No. 2-6 and 66 parts by weight of a polyester resin tetrahydrofuran solution containing 0.5 wt.% of a polyester resin (Vylon 200 made by Toyobo Company, Ltd.) was ground in a ball mill. The thus prepared dispersion was coated on an aluminum surface side of an aluminum-evaporated polyester film by a doctor blade and was then dried at 80° C. for 2 minutes, so that a charge carrier producing layer with a thickness of 0.7 μm was formed on the aluminum-evaporated polyester film.

Furthermore, 2 parts by weight of 1,1-bis(4-dibenzylaminophenyl)propane, 2 parts by weight of a polycarbonate resin (Trade Name: Panlite K-1300 made by Teijin Limited) and 16 parts by weight of tetrahydrofuran were mixed to form a solution. This solution was coated on the charge carrier producing layer by a doctor blade and was then dried at 120° C. for 10 minutes, so that a charge transporting layer with a thickness of 13 μm was formed on the charge carrier producing layer, whereby a layered type photoconductor as shown in FIG. 9 was prepared.

Vpo and E½ of this photoconductor were measured in the same manner as that in Example 2-38. The result showed that Vpo was −1000 V and E½ was 5.2 lux.sec.

EXAMPLE 2-45~2-49

Example 2-44 was repeated except that the bisazo compound No. 2-6 employed in Example 2-44 was replaced by the bisazo compounds listed in the following table 14, whereby the photoconductors of the type shown in FIG. 9 were prepared. Vpo and E½ of each of the photoconductors were measured in the same manner as in Example 2-38. The results are shown in Table 14.

TABLE 14

| Example No. | Bisazo Compound No. | Vpo (volt) | E½ (lux · sec) |
|---|---|---|---|
| 2-45 | 2-41 | −1010 | 3.5 |
| 2-46 | 2-43 | −1100 | 3.1 |
| 2-47 | 2-45 | −1100 | 4.0 |
| 2-48 | 2-47 | −1020 | 3.0 |

TABLE 14-continued

| Example No. | Bisazo Compound No. | Vpo (volt) | $E_{\frac{1}{2}}$ (lux · sec) |
|---|---|---|---|
| 2-49 | 2-50 | −1150 | 2.3 |

EXAMPLE 2-50

A mixture of 2 parts by weight of the bisazo compound No. 2-36 and 70 parts by weight of tetrahydrofuran was ground in a ball mill. The thus prepared dispersion was coated on an aluminum surface side of an aluminum-evaporated polyester film by a doctor blade and was then dried at room temperature, so that a charge carrier producing layer with a thickness of 1.5 μm was formed on the aluminum-evaporated polyester film.

Furthermore, 2 parts by weight of 1-phenyl-3-(4-diethylaminostyryl)-5-(4-diethylaminophenyl)pyrazoline, 3 parts by weight of polystyrene (Trade Name: Toporex made by Mitsui Toatsu Chemicals, Inc.) and 17 parts by weight of tetrahydrofuran were mixed to form a solution. This solution was coated on the charge carrier producing layer by a doctor blade and was then dried at 120° C. for 10 minutes, so that a charge transporting layer with a thickness of 16 μm was formed on the charge carrier producing layer, whereby a layered-type photoconductor as shown in FIG. 9 was prepared.

Vpo and $E_{\frac{1}{2}}$ of this photoconductor were measured in the same manner as that in Example 2-38. The result showed that Vpo was −520 V and $E_{\frac{1}{2}}$ was 2.4 lux.sec.

EXAMPLE 2-51~2-55

Example 2-50 was repeated except that the bisazo compound No. 2-36 employed in Example 2-50 was replaced by the bisazo compounds listed in the following table 15, whereby the photoconductors of the type shown in FIG. 9 were prepared. Vpo and $E_{\frac{1}{2}}$ of each of the photoconductors were measured in the same manner as in Example 2-38. The results are also shown in Table 15.

TABLE 15

| Example No. | Bisazo Compound No. | Vpo (volt) | $E_{\frac{1}{2}}$ (lux · sec) |
|---|---|---|---|
| 2-51 | 2-38 | −560 | 2.6 |
| 2-52 | 2-66 | −430 | 0.7 |
| 2-53 | 2-46 | −610 | 1.6 |
| 2-54 | 2-49 | −660 | 1.9 |
| 2-55 | 2-52 | −680 | 1.3 |

EXAMPLE 2-56

A mixture of 2 parts by weight of the bisazo compound No. 2-5 and 98 parts by weight of tetrahydrofuran was ground in a ball mill. The thus prepared dispersion was coated on an aluminum surface side of an aluminum-evaporated polyester film by a doctor blade and was then dried at room temperature, so that a charge carrier producing layer with a thickness of 1.0 μm was formed on the aluminum-evaporated polyester film.

Furthermore, 2 parts by weight of methylphenylhydrazone-3-methylidene-9-ethylcarbazole, 1 part by weight of poly-N-vinylcarbazole (Trade Name: Rubican M-170 made by BASF), 1 part by weight of a polyester resin (Vylon 200 made by Toyobo Company, Ltd.) and 18 parts by weight of tetrahydrofuran were mixed to form a solution. This solution was coated on the charge carrier producing layer by a doctor blade and was then dried at 120° C. for 10 minutes, so that a charge transporting layer with a thickness of 16 μm was formed on the charge carrier producing layer, whereby a layered-type photoconductor as shown in FIG. 9 was prepared.

Vpo and $E_{\frac{1}{2}}$ of this photoconductor were measured in the same manner as in Example 2-38. The result showed that Vpo was −820 V and $E_{\frac{1}{2}}$ was 1.6 lux.sec.

EXAMPLE 2-57~2-66

Example 2-56 was repeated except that the bisazo compound No. 2-5 employed in Example 2-56 was replaced by the bisazo compounds listed in the following table 16, whereby the photoconductors of the type shown in FIG. 9 were prepared. Vpo and $E_{\frac{1}{2}}$ of each of the photoconductors were measured in the same manner as in Example 2-38. The results are shown in Table 16.

TABLE 16

| Example No. | Bisazo Compound No. | Vpo (volt) | $E_{\frac{1}{2}}$ (lux · sec) |
|---|---|---|---|
| 2-57 | 2-6 | −790 | 2.3 |
| 2-58 | 2-16 | −690 | 1.4 |
| 2-59 | 2-66 | −910 | 0.9 |
| 2-60 | 2-48 | −860 | 1.0 |
| 2-61 | 2-41 | −770 | 0.9 |
| 2-62 | 2-43 | −880 | 0.7 |
| 2-63 | 2-45 | −870 | 0.8 |
| 2-64 | 2-47 | −910 | 0.8 |
| 2-65 | 2-50 | −860 | 0.8 |
| 2-66 | 2-69 | −910 | 0.8 |

EXAMPLE 2-67

A mixture of 10 parts by weight of a polyester resin (Trade Name: Vylon 200 made by Toyobo Company, Ltd.), 10 parts by weight of 2,5-bis(4-diethylaminophenyl)-1,3,4-oxadiazole, 2 parts by weight of the bisazo compound No. 2-66 and 108 parts by weight of tetrahydrofuran was ground in a ball mill. The thus prepared dispersion was coated on an aluminum surface side of an aluminum-evaporated polyester film by a doctor blade and was then dried at 120° C. for 10 minutes, so that a photoconductive layer with a thickness of 21 μm was formed on the aluminum-evaporated polyester film, whereby an electrophotographic photoconductor of the type as shown in FIG. 8 was prepared.

Vpo and $E_{\frac{1}{2}}$ of this photoconductor were measured in the same manner as in Example 2-38, except that the photoconductor was positively charged in the dark under application of +6 KV of corona charge. The result showed that Vpo was +1120 V and $E_{\frac{1}{2}}$ was 3.3 lux.sec.

EXAMPLE 2-68~2-72

Example 2-62 was repeated except that the bisazo compound No. 2-43 employed in Example 2-62 was replaced by the bisazo compounds listed in the following table 17, whereby the photoconductors of the type shown in FIG. 8 were prepared. Vpo and $E_{\frac{1}{2}}$ of each of the photoconductors were measured in the same manner as in Example 2-38. The results are shown in Table 17.

TABLE 17

| Example No. | Bisazo Compound No. | Vpo (volt) | E½ (lux · sec) |
|---|---|---|---|
| 2-68 | 2-15 | +930 | 5.2 |
| 2-69 | 2-48 | +1020 | 3.7 |
| 2-70 | 2-45 | +890 | 2.0 |
| 2-71 | 2-80 | +920 | 4.0 |
| 2-72 | 2-131 | +820 | 5.0 |

EXAMPLE 2-73

A mixture of 1 part by weight of a polyester resin (Trade Name: Polyester Adhesive 49000 made by Du Pont), 1 part by weight of the bisazo compound No. 2-5, and 26 parts by weight of tetrahydrofuran was ground in a ball mill. This dispersion was coated on an aluminum-evaporated polyester film by a doctor blade and was then dried at 100° C. for 10 minutes, so that a photoconductive layer with a thickness of 7 μm was formed on the aluminum-evaporated polyester film, forming an electrophotographic photoconductor of the type as shown in FIG. 7.

Vpo and E½ of this photoconductor were measured in the same manner as in Example 2-38, except that the photoconductor was positively charged in the dark under application of +6 KV of corona charge. The result showed that Vpo was +210 V and E½ was 10.8 lux.sec.

EXAMPLE 2-74~2-81

Example 2-68 was repeated except that the bisazo compound No. 2-15 employed in Example 2-68 was replaced by the bisazo compounds listed in the following table 18, whereby the photoconductors of the type shown in FIG. 7 were prepared. Vpo and E½ of each of the photoconductors were measured in the same manner as in Example 2-38. The results are shown in Table 18.

TABLE 18

| Example No. | Bisazo Compound No. | Vpo (volt) | E½ (lux · sec) |
|---|---|---|---|
| 2-74 | 2-6 | +190 | 4.4 |
| 2-75 | 2-7 | +210 | 7.4 |
| 2-76 | 2-15 | +330 | 5.3 |
| 2-77 | 2-48 | +290 | 4.1 |
| 2-78 | 2-53 | +180 | 8.8 |
| 2-79 | 2-135 | +310 | 7.9 |
| 2-80 | 2-137 | +220 | 10.0 |
| 2-81 | 2-142 | +270 | 9.5 |

What is claimed is:

1. A bisazo compound of the general formula:

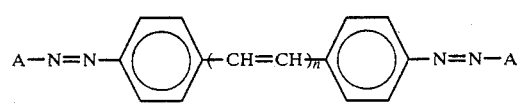

where n is an integer of 2 or 3, and when n=2, substituent A is selected from the group consisting of

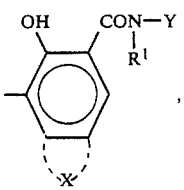  (a)

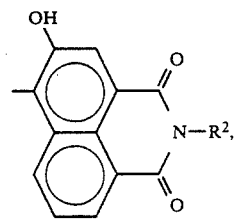  (b)

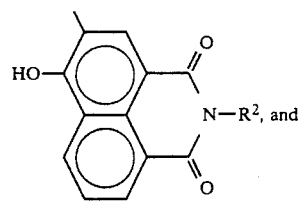  (c)

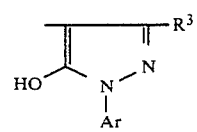  (d)

and when n=3, A is selected from the group consisting of the above substituents (a), (b) and (c), wherein $R^1$ is hydrogen, an alkyl group, an unsubstituted or substituted phenyl group; X is an unsubstituted or substituted cyclic hydrocarbon group, or an unsubstituted or substituted heterocyclic group; Y is an unsubstituted or substituted cyclic hydrocarbon group, an unsubstituted or substituted heterocyclic group, or

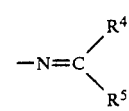

(in which $R^4$ is an unsubstituted or substituted cyclic hydrocarbon group, an unsubstituted or substituted heterocyclic group, an unsubstituted or substituted styryl group; $R^5$ is hydrogen, an alkyl group, an unsubstituted or substituted phenyl group; or $R^4$ and $R^5$ can form a ring in combination with carbon atoms bonded to $R^4$ and $R^5$); $R^2$ is an unsubstituted or substituted hydrocarbon group; $R^3$ is an alkyl group or a carboxyl group or an ester thereof; and Ar is an unsubstituted or substituted cyclic hydrocarbon group.

2. An electrophotographic photoconductor comprising an electroconductive support material having thereon a photoconductive layer containing a bisazo compound of the general formula:

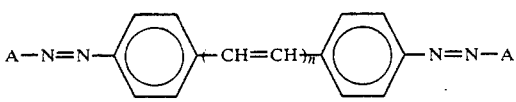

where n is an integer of 2 or 3, and when n=2, substituent A is selected from the group consisting of

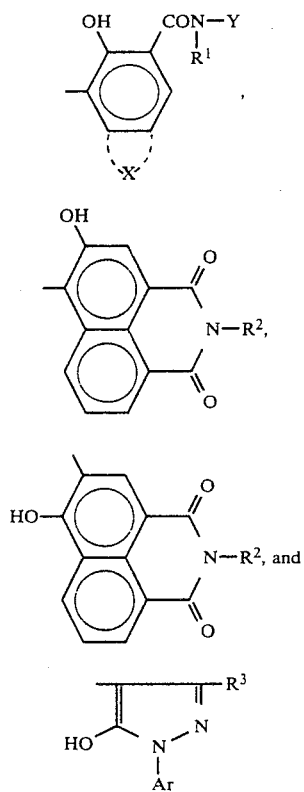

and when n=3, A is selected from the group consisting of the above substituents (a), (b) and (c), wherein $R^1$ is hydrogen, an alkyl group, an unsubstituted or substituted phenyl group; X is an unsubstituted or substituted cyclic hydrocarbon group, or an unsubstituted or substituted heterocyclic group; Y is an unsubstituted or substituted cyclic hydrocarbon group, an unsubstituted or substituted heterocyclic group, or

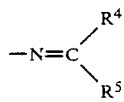

(in which $R^4$ is an unsubstituted or substituted cyclic hydrocarbon group, an unsubstituted or substituted heterocyclic group, an unsubstituted or substituted styryl group; $R^5$ is hydrogen, an alkyl group, an unsubstituted or substituted phenyl group; or $R^4$ and $R^5$ can form a ring in combination with carbon atoms bonded to $R^4$ and $R^5$); $R^2$ is an unsubstituted or substituted hydrocarbon group; $R^3$ is an alkyl group or a carboxyl group or an ester group thereof; and Ar is an unsubstituted or substituted cyclic hydrocarbon group.

3. An electrophotographic photoconductor as claimed in claim 2, wherein said photoconductive layer further comprises a binder agent in which said bisazo compound is dispersed, and the amount of said bisazo compound is in the range of 30 to 70 percent of the total weight of said photoconductive layer.

4. An electrophotographic photoconductor as claimed in claim 2, wherein said photoconductive layer further comprises a charge transporting medium containing a charge transporting material.

5. An electrophotographic photoconductor as claimed in claim 2, wherein said photoconductive layer comprises a charge carrier producing layer comprising said bisazo compound and, formed on said electroconductive support material, and a charge transporting layer formed on said charge carrier producing layer and, containing a charge transporting material.

6. An electrophotographic photoconductor as claimed in claims 3 and 4, wherein the thickness of said photoconductive layer is in the range of about 3 μm to about 50 μm.

7. An electrophotographic photoconductor as claimed in claim 5, wherein the thickness of said charge carrier producing layer is in the range of about 0.05 μm to about 5 μm, and the thickness of said charge transporting layer is in the range of about 3 μm to about 50 μm.

8. An electrophotographic photoconductor as claimed in claim 4, wherein the amount of said bisazo compound is in the range of about 1 wt.% to about 50 wt.%, and the amount of said charge transporting material is in the range of about 10 wt.% to about 95 wt.% of the total weight of said photoconductive layer.

9. An electrophotographic photoconductor as claimed in claim 5, wherein the amount of said charge transporting material in said charge transporting layer is in the range of about 10 wt.% to about 95 wt.% of the total weight of said photoconductive layer.

10. A bisazo compound as claimed in claim 1 in which A is substituent (a).

11. A bisazo compound as claimed in claim 1 in which A is substituent (b) or substituent (c).

12. A bisazo compound as claimed in claim 1 in which A is substituent (d).

13. An electrophotographic photoconductor as claimed in claim 2 in which A is substituent (a).

14. An electrophotographic photoconductor as claimed in claim 2 in which A is substituent (b) or substituent (c).

15. An electrophotographic photoconductor as claimed in claim 2 in which A is substituent (d).

* * * * *